(12) United States Patent
Kozuka

(10) Patent No.: US 12,115,709 B2
(45) Date of Patent: Oct. 15, 2024

(54) MOLDING ASSISTANCE DEVICE FOR INJECTION MOLDING MACHINE

(71) Applicant: NISSEI PLASTIC INDUSTRIAL CO., LTD., Nagano-ken (JP)

(72) Inventor: Makoto Kozuka, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 524 days.

(21) Appl. No.: 17/432,625

(22) PCT Filed: Dec. 5, 2019

(86) PCT No.: PCT/JP2019/047716
§ 371 (c)(1),
(2) Date: Aug. 20, 2021

(87) PCT Pub. No.: WO2020/170552
PCT Pub. Date: Aug. 27, 2020

(65) Prior Publication Data
US 2022/0134623 A1 May 5, 2022

(30) Foreign Application Priority Data

Feb. 21, 2019 (JP) ................................ 2019-029705

(51) Int. Cl.
*B29C 45/76* (2006.01)
(52) U.S. Cl.
CPC .... *B29C 45/766* (2013.01); *B29C 2045/7606* (2013.01); *B29C 2945/76913* (2013.01)
(58) Field of Classification Search
None
See application file for complete search history.

(56) References Cited

U.S. PATENT DOCUMENTS

| 5,262,490 A | * | 11/1993 | Kolb | ......................... C08F 8/00 |
| | | | | 525/379 |
| 2009/0140446 A1 | * | 6/2009 | Masuda | ................ B29C 45/766 |
| | | | | 264/40.7 |

(Continued)

FOREIGN PATENT DOCUMENTS

| JP | 2002-67109 A | 3/2002 |
| JP | 2003-340891 A | 12/2003 |

(Continued)

OTHER PUBLICATIONS

International Search Report (PCT/ISA/210) issued in PCT/JP2019/047716, dated Feb. 10, 2020.

*Primary Examiner* — David Earl Ogg
(74) *Attorney, Agent, or Firm* — Birch, Stewart, Kolasch & Birch, LLP

(57) ABSTRACT

A molding machine is provided with a basic information setting function unit for setting basic information including resin data relating to pellet material, screw data relating to screw, and molding condition data relating to molding conditions, computation processing function unit comprising a provisional plastication time computation processing unit for calculating a provisional plastication time from the basic information, a melt film heating amount computation processing unit for calculating a heating amount of a melt film from the provisional plastication time obtained from the provisional plastication time computation processing unit, and a plastication delay time conversion processing unit for converting the heating amount of the melt film obtained from the melt film heating amount computation processing unit into a plastication delay time, and an output function unit for outputting plastication delay time or plastication information obtained based on the plastication delay time.

15 Claims, 13 Drawing Sheets

(56) References Cited

U.S. PATENT DOCUMENTS

| | | | | |
|---|---|---|---|---|
| 2010/0219564 A1* | 9/2010 | Ohmi | ................. | B29C 45/0001 |
| | | | | 264/488 |
| 2013/0103184 A1* | 4/2013 | Morikawa | ............... | B29C 45/76 |
| | | | | 700/197 |
| 2019/0388962 A1* | 12/2019 | Kurosawa | ................ | B22C 3/00 |
| 2020/0198201 A1* | 6/2020 | Shimokusuzono | ... | B29C 45/766 |

FOREIGN PATENT DOCUMENTS

| | | | |
|---|---|---|---|
| JP | 2009202482 A * | 9/2009 | |
| JP | 2017-7207 A | 1/2017 | |
| JP | 6185515 B2 * | 8/2017 | |
| WO | WO 2012/002374 A1 | 1/2012 | |
| WO | WO 2018/166230 A1 | 8/2018 | |

* cited by examiner

EASINESS OF ADHESION

| SCREW SURFACE METAL | RESIN TYPE | | | | |
|---|---|---|---|---|---|
| | PP | POM | ABS | GPPS | LDPE |
| Cr | 1 | 2 | 3 | 4 | 2 |
| CrN | 2 | 3 | 4 | 4 | 1 |
| TiN | 3 | 1 | 2 | 4 | 2 |
| TiC | 4 | 2 | 1 | 4 | 3 |

EASINESS OF DECMPOSITION

| SCREW SURFACE METAL | RESIN TYPE | | | | |
|---|---|---|---|---|---|
| | PP | POM | ABS | GPPS | LDPE |
| Cr | 1 | 1 | 1 | 1 | 1 |
| CrN | 2 | 2 | 2 | 2 | 2 |
| TiN | 3 | 3 | 3 | 3 | 3 |
| TiC | 4 | 4 | 4 | 4 | 4 |

| DETERMINATION CRITERIA PLASTICATION DELAY TIME [sec] | DETERMINATION RESULT | |
|---|---|---|
| $-2 < Hmr < 2$ | EXCELLENT | → SUPPORT MESSAGE mdr |
| $-2 \geq Hmr$ | GOOD | → SUPPORT MESSAGE md1 |
| $-2 \leq Hmr < 5$ | PASS | → SUPPORT MESSAGE md2 |
| $5 \leq Hmr$ | FAIL | → SUPPORT MESSAGE md3 |

Dhf

MOLDING ASSISTANCE DEVICE FOR INJECTION MOLDING MACHINE

TECHNICAL FIELD

The present invention relates to a molding assistance device for an injection molding machine suitable for supporting molding of an injection molding machine for injecting and filling molten resin into a mold with a screw molding the molten resin.

BACKGROUND ART

In general, an injection molding machine performs molding by injecting and filling a mold with a plasticized molten resin by a screw. Thus, whether or not the molten resin is maintainable in an appropriate state is essential for ensuring the desired molding quality. In particular, if plastication excessively progresses, the resin decomposition ratio increases, resulting in problems like deterioration (such as carbonization) of the molten resin and the generation of unnecessary gas. Such issues are closely related to the molding conditions and residence time of the molten resin. For example, suppose the molding conditions are not suitable or the residence time is prolonged. In that case, there are risks that the plastication proceeds excessively and the resin decomposition ratio increases. Therefore, various techniques have been proposed to grasp the state of the molten resin in the heating cylinder and reduce the resin decomposition ratio.

On the other hand, stabilizing the molten state by ensuring an appropriate plastication time and maintaining the unmelted fraction (solid-state ratio) of the molten resin at or below a certain level is essential in reducing the plastication failure of the molded article. Therefore, a technique for grasping the plastication time and ensuring an appropriate plastication time has also been proposed.

Conventionally, as this type of technology, a plastication management apparatus for an injection molding machine disclosed in Patent Document 1 and an injection molding machine disclosed in Patent Document 2 (a method for estimating plastication time) are known. The plastication management apparatus disclosed in Patent Document 1 aims to obtain a plastication management apparatus for an injection molding machine capable of accurately determining whether or not a plastication state is stable. Specifically, the plastication management device is provided with a current detection means for detecting a drive current of a plastication motor for rotating a screw during a measuring operation, a rotational speed detection means for detecting a rotational speed of the plastication motor for rotating the screw, a torque calculation means for calculating a drive torque of the motor from the drive current of the plastication motor, a computation means for calculating an instantaneous value of the drive power of the plastication motor based on the calculated drive torque and the detected rotational speed of the motor, and an integrator for integrating the instantaneous value of the calculated drive power during the plastication time.

Further, the injection molding machine disclosed in Patent Document 2 comprises a storage unit, an input unit, a computation unit, and a display unit. The storage unit performs injection molding of a certain resin using a standard injection molding machine having an ideal plastication capability which is a processing capability per hour when a specific resin is continuously plasticized. The storage unit measures the actual mass of a shot from the weight of this molded product and the plastication time at that occasion. The storage unit calculates the plastication power by giving the mass of one shot, the plastication time, and the ideal plastication capability to the calculation formula for the plastication power. In addition, the storage unit stores a correlation map of the type of resin and the plastication power prepared by performing the same calculation on a different kind of resin. The input unit inputs the type of resin to be used in an injection molding machine different from the standard injection molding machine, the cavity volume of the mold, and the ideal plasticating capability of the different injection molding machine. The computation unit selects the plastication power from the type of resin to be used in the other injection molding machine, and the correlation map estimates the mass of one-shot from the cavity volume of the mold and the density of the resin to be used and estimates the plastication time by giving the plastication power, the mass of one shot and the ideal plastication capability of the other injection molding machine to the calculation formula of the plastication time. The display unit displays the plastication time estimated by the computation unit.

PRIOR ART PUBLICATIONS

Patent Publications

Patent Document 1: Japanese Unexamined Patent Application Publication No. 2003-340891

Patent Document 2: Japanese Unexamined Patent Application Publication No. 2002-067109

DISCLOSURE OF THE INVENTION

Problem to be Solved by the Invention

However, the above-described conventional technique for understanding the plastication time also had the following problems to be solved.

First, in both cases, the plastication time is grasped based on the indirect physical quantities obtained from the operating state of the injection molding machine. Thus, neither case is necessarily qualitatively or quantitatively sufficient for an accurate understanding of the plastication time. Therefore, the plastication time can only be grasped as rough information. It is not easy to take the right action based on accurate plastication time. Accordingly, there is a limit to reducing the plastication failure by ensuring the proper plastication time and maintaining the molten resin's unmelted fraction (solid-state ratio) at or below a certain level.

Second, the plastication time is grasped fundamentally based on information obtained from the operating state of the injection molding machine by actually operating the injection molding machine. Thus, the grasping process (work process) becomes troublesome. Therefore, its use is difficult from utilizing the molding assistance device, such as an increase in working steps and a waste of resin material. In particular, from the viewpoint of using it for setting molding conditions, the plastication time isn't easy to reflect it accurately and easily. In addition, it is necessary to deal with each injection molding machine. Accordingly, there is difficulty in versatility and expandability as a molding assistant device.

The present invention's objective is to provide a molding assistance device for an injection molding machine that solves the problems existing in the background art.

Means for Solving the Problem

A molding assistance device 1 for an injection molding machine M for injecting a plasticized molten resin by means of a screw 3 and filling a mold 2 with a plasticized molten resin and performs molding support for the injection molding machine M, characterized by comprising the following: a basic information setting function unit Fi for setting basic information Do including at least resin data Dr relating to a pellet material Rp, screw data Ds relating to a screw 3, and molding condition data Dm relating to molding conditions; a computation processing function unit 5 comprising at least a provisional plastication time computation processing unit Fca for calculating a provisional plastication time Hm from the basic information Do; a melt film heating amount computation processing unit Fcb for calculating a heating amount Em of a melt film Rpf from the provisional plastication time Hm obtained from the provisional plastication time computation processing unit Fca; a plastication delay time conversion processing unit Fcc for converting the heating amount Em of the melt film Rpf obtained from the melt film heating amount computation processing unit Fcb into a plastication delay time Hmr; and an output processing function unit 6 for outputting plastication delay time Hmr or plastication information obtained based on the plastication delay time Hmr.

In this case, according to the preferred embodiment of the invention, the resin data Dr may include at least the type of resin and the melt flow rate (MFR) Drf. Further, the computation processing function unit 5 may be provided with a first determination processing unit Fci to determine the plastication delay time Hmr based on a predetermined determination criterion and output the obtained determination result. In addition, the output processing function unit 6 may be provided with a determination results display processing unit Fdi for displaying the determination result at least on the display 7d provided in the molding machine controller 7. Further, the computation processing function unit 5 may be provided with an estimated plastication time computation unit Fcs for obtaining an estimated plastication time Hms, which is a plastication time obtained by correcting the provisional plastication time Hm by the plastication delay time Hmr. In addition, the output processing unit 6 may be provided with an estimated plastication time display processing unit Fds for displaying the estimated plastication time Hms on the display 7d provided in the molding machine controller 7. On the other hand, the computation processing function unit 5 may be provided with a solid-state ratio computation processing unit Fcp for obtaining an estimated solid-state ratio Xc of the molten resin at the end of measurement by a computation based on solid-state ratio computational data Dc for calculating the solid-state ratio of the molten resin in the heating cylinder 4 based on the basic information Do. Also, the screw data Ds may include data relating to the type of material of the screw surface 3f, so that the computation processing function unit 5 may be provided with a decomposition ratio computation processing unit Fcr for calculating an estimated resin decomposition ratio Xr from basic information Do and by calculating the decomposition ratio computational data Dr for calculating the resin decomposition ratio of the screw surface 3f during molding based on the basic information Do. Further, the computation processing function unit 5 may be provided with a second determination processing unit Fcj for determining the estimated solid-state ratio Xc and/or the estimated resin decomposition ratio Xr and outputting the obtained determination result. In addition, the determination results display processing unit Fdi may be provided with a function for displaying the determination result obtained from the second determination processing unit Fcj.

Effects of the Invention

According to the present invention, the molding assistance device 1 of the injection molding machine has the following remarkable effects.

(1) The molding assistance device 1 of the injection molding machine comprises at least the basic information setting function unit Fi that sets the basic information Do including the resin data Dr related to the pellet material Rp, the screw data Ds related to the screw 3, and the molding condition data Dm related to the molding conditions; at least the provisional plastication time computation processing unit Fca for obtaining the provisional plastication time Hm from basic information Do; the melt film heating amount computation processing unit Fcb for calculating the heating amount Em of the melt film Rpf from the provisional plastication time Hm obtained from the provisional plastication time computation unit Fca; and the plastication delay time conversion processing unit Fcc that converts the heating amount Em of the melt film Rpf obtained from the melt film heating amount computation processing unit Fcb into the plastication delay time Hmr. Therefore, the plastication time can be obtained in consideration of the heating amount Em of the melt film Rpf. As a result, it is possible to stably produce a molten state maintaining the molten resin's unmelted fraction (solid-state ratio) at or below a predetermined level. As a result, eliminating plastication failure improves the yield of good products and improves molding quality.

(2) Acquiring data related to the plastication time by the molding assistance device 1 before production eliminates a step of operating an actual injection molding machine. Therefore, it is possible to reduce the number of steps for determining the plastication time and effectively avoid wasting resin material. In addition, accurate determination of the plastication time is facilitated based on data such as the resin data Dr, the screw data Ds and the molding condition data Dm. Thus, the molding assistance device can be broadly utilized in various injection molding machines, proving its excellence in versatility and expandability.

(3) According to the preferred embodiment, providing the first determination processing unit Fci, which determines the plastication delay time Hmr based on a predetermined determination criterion and outputs the obtained determination result in the computation processing function unit 5, allows for objectively determining the quality of the plastication delay time Hmr without depending on the operator's determination. Thus, even a beginner can easily and reliably check the plastication time.

(4) According to the preferred embodiment, if the output processing function unit 6 is provided with the determination results display processing unit Fdi, which displays the determination result at least on the display 7d provided in the molding machine controller 7, the operator can visually and easily check the degree (level) of "excellent, good, pass, fail," or the like, as the determination result. Therefore, it is possible to display an appropriate assistance message corresponding to the degree and quickly and accurately correct the molding conditions.

(5) According to the preferred embodiment, if the computation processing function unit 5 is provided with the estimated plastication time computation unit Fcs for obtaining the estimated plastication time Hms, which is the provisional plastication time Hm corrected by the plastication delay time Hmr, the appropriate plastication time in consideration of the influence of the melt film Rpf can be obtained as the estimated plastication time Hms so that it is possible to grasp the appropriateness of the plastication state by the plastication delay time Hmr and to come to know the appropriate plastication time in plastication.

(6) According to the preferred embodiment, when the estimated plastication time display processing unit Fds for displaying the estimated plastication time Hms on the display 7d provided in the molding machine controller 7 is provided in the output processing function unit 6, the operator can quickly and easily know the appropriate plastication time from a visual viewpoint, and therefore, it is possible to easily perform minute adjustments of the molding conditions using the plastication time as a guideline, and thereby contribute to further stabilizing the molten state.

(7) According to a preferred embodiment of the present invention, if computation processing function unit 5 is provided with a solid-state ratio computation processing unit Fcp for obtaining the estimated solid-state ratio Xc of the molten resin at the end of measurement by the calculation using the solid-state ratio computational data Dc for calculating the solid-state ratio of the molten resin in the heating cylinder 4 based on the basic information Do, it is possible to understand the insufficient plastication of the molten resin from the side of the estimated solid-state ratio Xc, so that appropriate measures can be taken against insufficient plastication. In particular, by combining the estimated plastication time Hms and plastication delay time Hmr with plastication information, it is possible to enhance further the reliability of the determination of suitability for the molten state of the resin.

(8) According to the preferred embodiment, including data relating to the type of material of the screw surface 3f in the screw data Ds allows for reflecting the deterioration factor due to the catalytic effect of the metal material of the screw surface 3f on the molten resin and the ease of adhesion in the calculation process, enabling more accurate estimation of the molten state.

(9) According to the preferred embodiment, providing the processing unit 5 with the decomposition ratio computation processing unit Fcr for obtaining the estimated resin decomposition ratio Xr by calculation using the decomposition ratio computational data Dr for obtaining the resin decomposition ratio of the screw surface 3f during molding based on the basic information Do facilitates obtaining the estimated resin decomposition ratio Xr using the basic information Do, and also enables accurately grasping the deterioration state of the molten resin based on the obtained estimated resin decomposition ratio Xr. As a result, the proper range of the molten state can be set by both the limit point on one side (insufficient plastication side) of the molten state based on the estimated solid-state ratio Xc and the limit point on the other side (excessive plastication side) of the molten state based on the estimated resin decomposition ratio Xr. Thus, the molding quality can be improved and stabilized.

(10) According to the preferred embodiment, by providing the computation processing function unit 5 with the second determination processing unit Fcj for determining the magnitude of the constant solid-state ratio Xc and/or the estimated resin decomposition ratio Xr and outputting the obtained determination result, and providing the determination results display processing unit Fdi with the display function of the determination result obtained from the second determination processing unit Fcj, the operator can visually confirm the determination result and can easily come to know the molten state of the molten resin, which is normally challenging to determine. Therefore, even an inexperienced operator can easily and reliably check whether or not the molten state of the molten resin is appropriate and can quickly take necessary measures such as changing the molding conditions, thereby streamlining the molding production. In particular, combining the determination of the suitability of the plastication delay time Hmr and grasping the estimated plastication time Hms can further optimize the molding process.

DESCRIPTION OF REFERENCE NUMERALS

1: molding assistance device, 2: mold, 3: screw, 3f: screw surface, 4: heating cylinder, 5: computation processing function unit, 6: output processing function unit, 7: molding machine controller, 7d: display, M: injection molding machine, Rp: pellet material, Rpf: melt film, Dr: resin data, Drf: melt flow rate (MFR), Ds: screw data, Dm: molding condition data, Do: basic information, Dc: solid state ratio computational data, Dr: decomposition ratio computational data, Fi: basic information setting function unit, Fca: provisional plastication time computation processing unit, Dc: solid state ratio computational data, Dr: decomposition ratio computational data, Fi: basic information setting function unit, Fca: provisional plastication time computation processing unit, Fcb: melt film heating amount computation processing unit, Fcc: plastication delay time conversion processing unit, Fci: first determination processing unit, Fcs: estimated plastication time computation unit, Fcp: solid state ratio computation processing unit, Fcr: decomposition ratio computation processing unit, Fcj: second determination processing unit, Fdi: determination results display processing unit, Fds: estimated plastication time display processing unit, Hm: provisional plastication time, Hmr: plastication delay time, Hms: estimated plastication time, Em: heating amount, Xc: estimated solid-state ratio, Xr: estimated resin decomposition ratio

BEST MODE FOR CARRYING OUT THE INVENTION

Next, the best embodiment of the present invention is described in detail with reference to the drawings.

First, an outline of an injection molding machine M capable of utilizing the molding assistance device 1 according to the present embodiment is described with reference to FIGS. 1 to 3.

Figure 3:
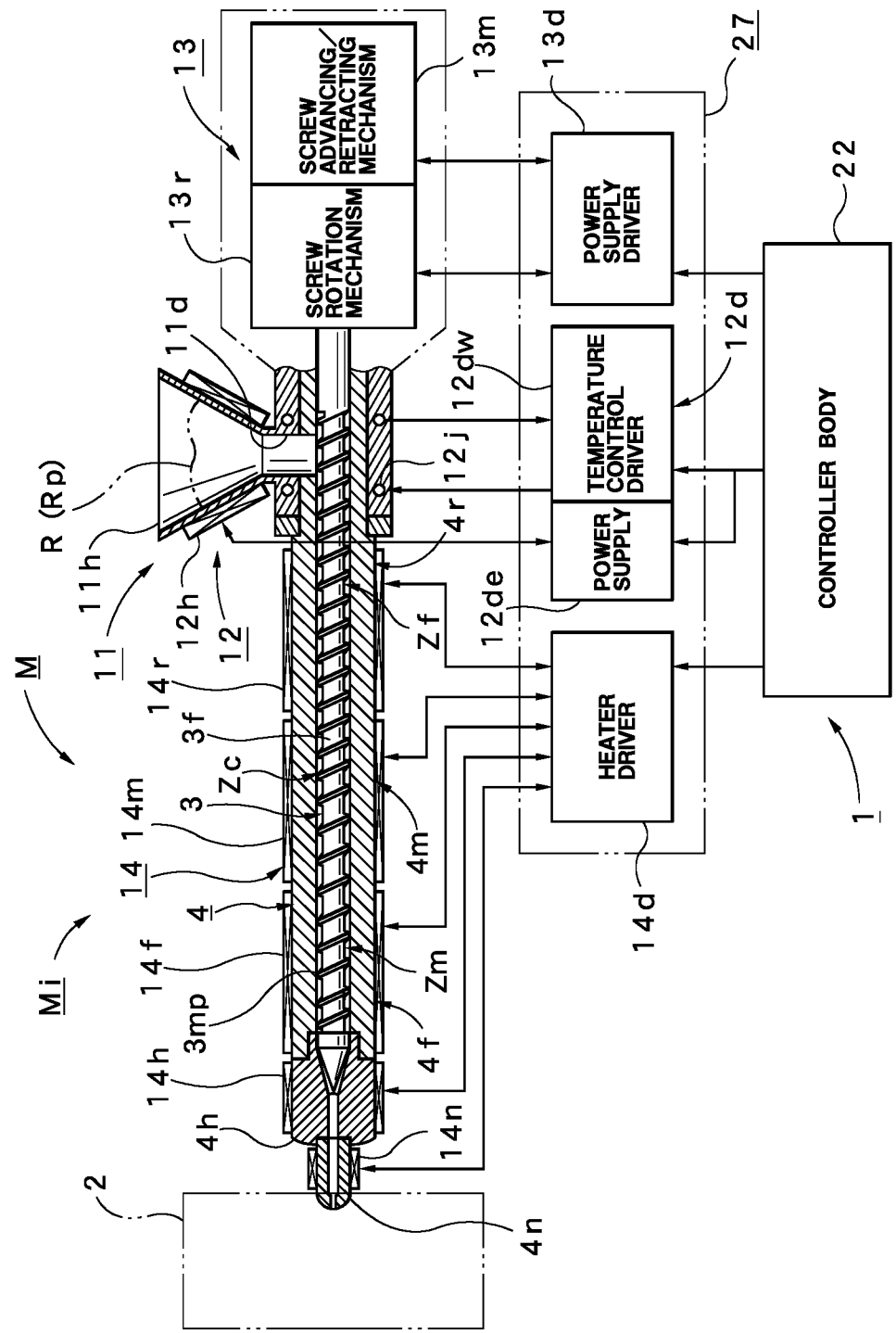
FIG. 3 is a structural view showing a mechanical structure of an injection molding machine, including the molding assistance device.

FIG. 3 shows an injection molding machine M, particularly an injection device Mi in which a mold clamping apparatus is omitted. In the injection device Mi, reference numeral 4 denotes a heating cylinder, and a nozzle 4n is attached to the front-end portion of the heating cylinder 4 via a head portion 4h. The nozzle 4n has the function of injecting the molten resin inside the heating cylinder 4 into mold 2, indicated by the imaginary line. A hopper 11h is provided at the upper rear end of the heating cylinder 4. A material drop port 11d penetrating the heating cylinder 4 is formed between the lower end opening of the hopper 11h and the interior of the heating cylinder 4. As a result, the hopper 11h and the inside of the heating cylinder 4 communicate through the material drop port 11d. The resin material R indicated by the imaginary line in the hopper 11h is supplied to the inside of the heating cylinder 4 through the material drop port 11d. Accordingly, the hopper 11h and the material drop port 11d constitute a material supply unit 11 for supplying the resin material R into the heating cylinder 4.

On the other hand, a heater 12h for heating the resin material R contained in the hopper 11h is attached to the outer peripheral surface of the hopper 11h. A water jacket 12j is formed in heating cylinder 4 around the material drop port 11d. The heater 12h is connected to the power supply circuit 12de of the temperature control driver 12d. The water jacket 12j is connected to the temperature control water circulation circuit 12dw of the temperature control driver 12d. The temperature control water circulation circuit 12dw can control (heat or cool) the temperature of the pellet material Rp passing through the material drop port 11d by circulating the temperature-controlled water medium (hot water or cooling water) in the water jacket 12j. Further, the power supply circuit 12de and the temperature control water circulation circuit 12dw connect to the controller main body 22. As a result, control commands for the power supply circuit 12de and the temperature control water circulation circuit 12dw are given from the controller body 22 to the temperature control driver 12d. The controlled temperature Tr is detected by a temperature sensor (not shown), and this detection signal is given to the temperature adjustment driver 12d. Accordingly, the heater 12h, the water jacket 12j, and the temperature control driver 12d constitute a temperature control unit 12 for controlling the temperature of the material supply unit 11.

On the other hand, a screw 3 is mounted inside the heating cylinder 4 so as to be freely rotatable and freely retractable. A helical flight portion 3mp is formed on the outer peripheral surface of the screw 3, and the screw surface 3f is coated with a predetermined surface material (metal) in consideration of durability and the like. The screw 3 has a metal-ring zone Zm, a compression zone Zc, and a feed zone Zf from the front side to the rear side. On the other hand, the rear end portion of screw 3 is coupled to the screw drive portion 13.

The screw drive unit 13 includes a screw rotation mechanism 13r for rotating the screw 3 and a screw advancing and retracting mechanism 13m for advancing and retracting the screw 3. Although the drive system of the screw rotation mechanism 13r and the screw advancing and retracting mechanism 13m is illustrated as an electric system using an electric motor, it may be a hydraulic system using a hydraulic circuit, and the drive system is not limited. The screw rotation mechanism 13r and the screw advancing and retracting mechanism 13m are connected to the power supply driver 13d, and the power supply driver 13d is connected to the controller body 22. As a result, a control command for the screw rotation mechanism 13r and the screw advancing and retracting mechanism 13m is given from the controller body 22 to the power supply driver 13d. Physical quantities such as the speed and the position of the screw 3 are detected by a speed sensor and a position sensor (not shown), and the detection signal is given to the power supply driver 13d.

Further, the heating cylinder 4 has a heating cylinder front section 4f, a heating cylinder central section 4m, and a heating cylinder rear section 4r from the front side to the rear side, and a front heating unit 14f, a central heating unit 14m, and a rear heating unit 14r are respectively attached to the outer peripheral surfaces of the respective sections 4f, 4m, and 4r. Similarly, a head heating unit 14h is provided on the outer peripheral surface of the head portion 4h, and a nozzle heating unit 14n is provided on the outer peripheral surface of the nozzle 4n. Each of these heating units, 14f, 14m, 14r, 14h, and 14n, can be constituted by a band heater, or the like. Accordingly, the nozzle heating unit 14n, the head heating unit 14h, the front heating unit 14f, the central heating unit 14m, and the rear heating unit 14r constitute the heating group unit 14. The heating group unit 14 is connected to the heater driver 14d, and the heater driver 14d is connected to the controller body 22. Thus, control commands for the heating units 14f, 14m, 14r, 14h, and 14n are given from the controller body 22 to the heater driver 14d. The heating temperature is detected by a temperature sensor (thermocouple or the like) (not shown). This detection signal is given to the heater driver 14d.

Figure 1:
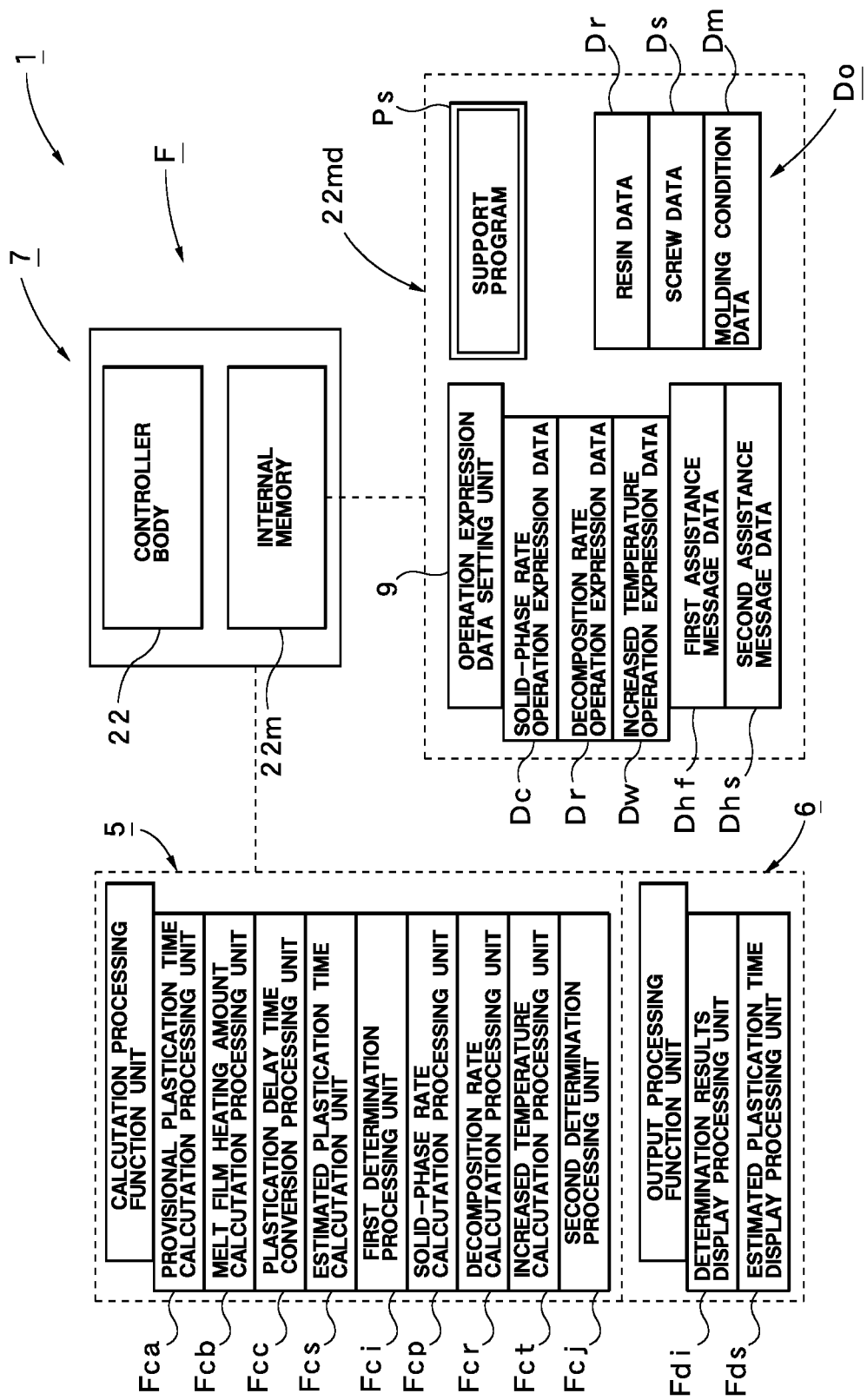
FIG. 1 is a block diagram of a processing system (control system) in a molding assistance device of an injection molding machine according to a preferred embodiment of the present invention.
Figure 2:
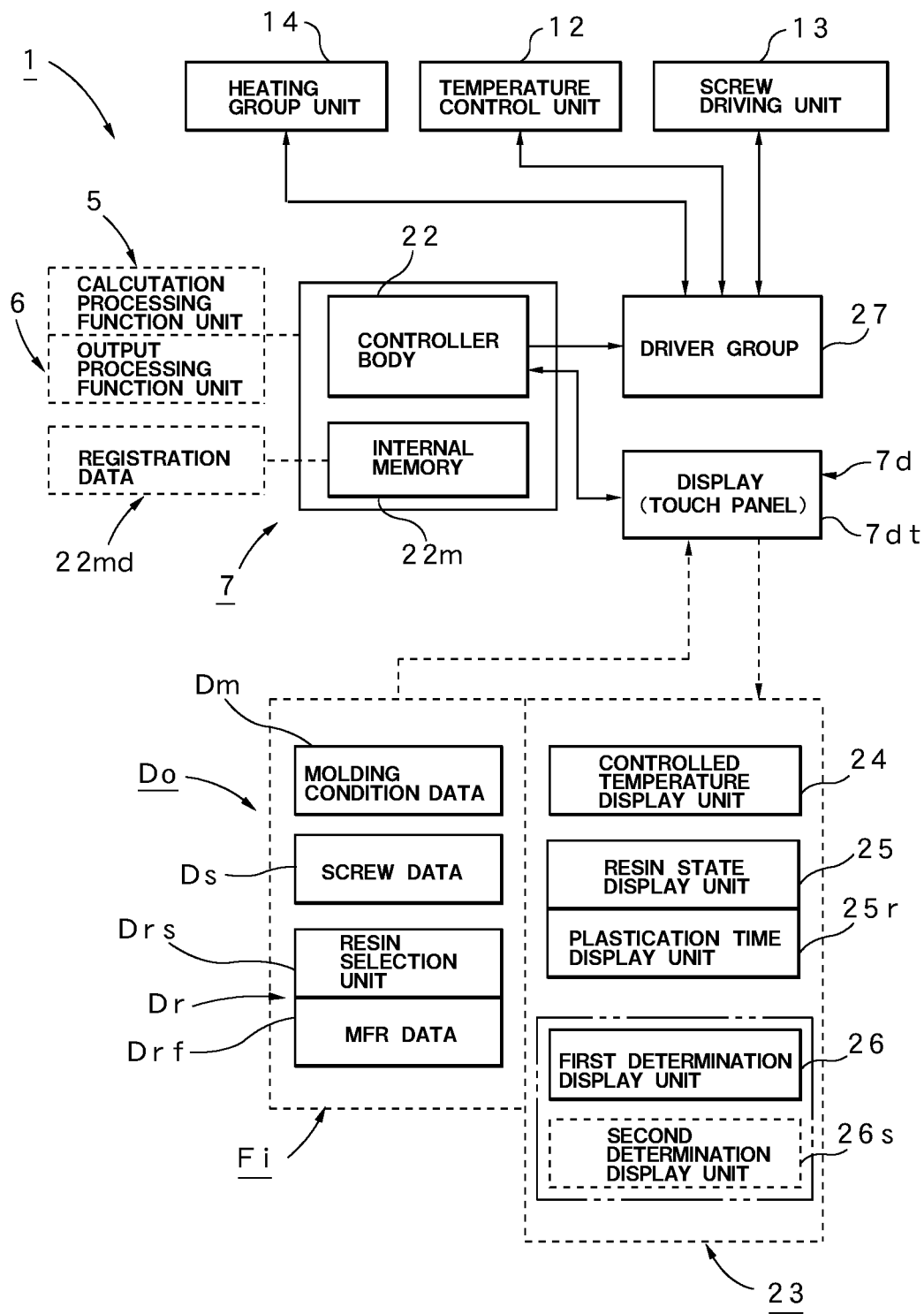
FIG. 2 is a block diagram of an input/output system (control system) in the molding assistance device.

On the other hand, FIGS. 1 and 2 show a molding machine controller 7, which controls the entire injection molding machine M. The molding machine controller 7 includes a controller body 22 having a computer function including hardware such as a CPU, and an internal memory 22m in which registration data 22md including various data and programs are written. A display 7d is connected to the controller body 22. The display 7d can display necessary information and is provided with a touch panel 7dt, which can be used to perform various operations such as input, setting, and selection. Further, a driver group 27 for driving (operating) various actuators is connected to the controller body 22. Driver group 27 includes a temperature control driver 12d, including the power supply circuit 12de and the temperature control water circulation circuit 12dw shown in FIG. 3, a power supply driver 13d, and a heater driver 14d.

Accordingly, the molding machine controller 7 includes the HMI control system and the PLC control system, and the internal memory 22m stores the PLC program and the HMI program. The PLC program executes sequence operations of various processes in the injection molding machine M, monitoring of the injection molding machine M, and the like, and the HMI program executes setting and display of the operation parameters of the injection molding machine M, display of the operation monitoring data of the injection molding machine M, and the like.

Next, with reference to FIGS. 1-19 and 20a-20d, a description is given of a configuration of a molding assistance device 1 according to the present embodiment, which can be used for such an injection molding machine M.

The molding assistance device 1 according to the present embodiment includes a molding machine controller 7 and peripheral actuators shown in FIGS. 1 and 2. Therefore, the internal memory 22m of the molding machine controller 7 stores the assistance program Ps by the application program, which causes the molding assistance device 1 to function.

The molding assistance device 1 has a basic function for maintaining the molten state of the resin in the heating cylinder 4 in an optimal state. Therefore, first, the basic functions of the molding assistance device 1 according to the present embodiment is described to facilitate an understanding of the structure of the main parts of the molding assistance device 1 according to the present embodiment.

As shown in FIG. 2, the molding assistance device 1 having the basic function includes at least a basic information setting function unit Fi for setting basic information Do including resin data Dr relating to pellet material Rp, screw data Ds relating to screw 3, and molding condition data Dm relating to molding conditions. The basic information setting function unit Fi can use a touch panel 7dt attached to the display 7d. An input screen (not shown) displayed on the display 7d enables setting by inputting or selecting a necessary numerical value through the touch panel 7dt.

Figure 4:
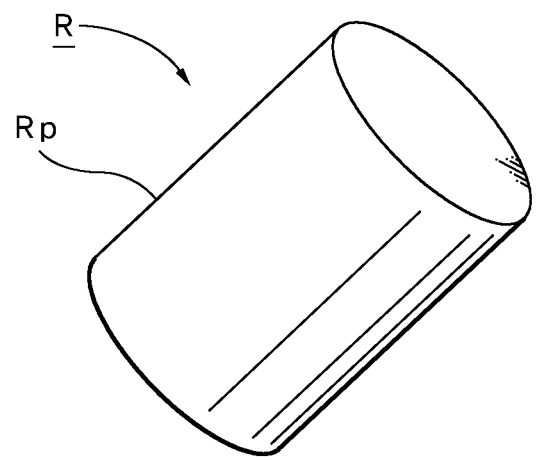
FIG. 4 is a perspective view schematically showing an example of a pellet material which is a resin material used in the injection molding machine.

In this case, the resin data Dr includes data (MFR data) Drf at least relating to the type of resin and the melt flow rate. The type of resin can be selected by the resin selection unit Drs. Therefore, in the registration data 22md, data such as characteristics relating to various resins, or data relating to various physical properties of each pellet material Rp, such as melting characteristics, are registered in advance. The MFR data Drf may be set by inputting a numerical value or may be input together by selecting a resin. The physical properties (melting properties, and the like) of each pellet material Rp are reflected in calculating the solid-state ratio Xc described later, to obtain more accurate estimated solid-state ratio Xcs. FIG. 4 schematically shows an example of the pellet material Rp.

The molding condition data Dm includes various kinds of data relating to molding conditions for molding by the injection molding machine M, various kinds of data relating to different physical quantities such as screw rotation frequency, measurement time, back pressure, measurement position, front temperature, central temperature, rear temperature 1, rear temperature 2, molding cycle time, and the like, that is, various kinds of information relating to molding conditions.

The screw data Ds includes various types of data relating to the form of the screw 3, for example, various types of data relating to various dimensions such as the outer diameter of the screw, the flight width of the screw, the friction coefficient between the solid and the screw, the depth of the screw groove, the length in the direction of the screw width, the screw lead, the flight coefficient, the helix angle of the screw flight, and the number of pitches, and various types of information relating to the screw, such as data relating to the kind of material of the screw surface 3f. In particular, including data relating to the type of material of the screw surface 3f enables reflection of the deterioration factor due to the catalytic effect of the metal material of the screw surface 3f on the molten resin and the easiness of adhesion in the computation processing, so that the molten state can be estimated more accurately.

On the other hand, the molding assistance device 1 includes a data processing unit F shown in FIG. 1. The data processing unit F includes a computational data setting unit 9 using the internal memory 22m, and the computational data setting unit 9 sets solid-state ratio computational data Dc, decomposition ratio computational data Dr, and increasing temperature computational data Dw. The solid-state ratio computational data Dc is data relating to the calculation formula for calculating the solid-state ratio Xc of the molten resin in the heating cylinder 4 based on the above-mentioned basic information Do. The decomposition ratio computational data Dr is data relating to the calculation formula for calculating the resin decomposition ratio Xr of the screw surface 3f during molding based on the above-mentioned basic information Do. The increasing temperature computational data Dw is data relating to the calculation formula for calculating the rising temperature ΔTu based on data relating to the shear heating amount Ec used for computation processing based on the decomposition ratio computational data Dr.

Next, the solid-state ratio computational formula for obtaining the solid-state ratio Xc, which is the basis of the solid-state ratio computational data Dc, the decomposition ratio computational formula for obtaining the resin decomposition ratio Xr, which is the basis of the decomposition ratio computational data Dr, and the increasing temperature calculation formula for obtaining the increasing temperature ΔTu, which is the basis of the increasing temperature computational data Dw, is described in detail.

Figure 5:
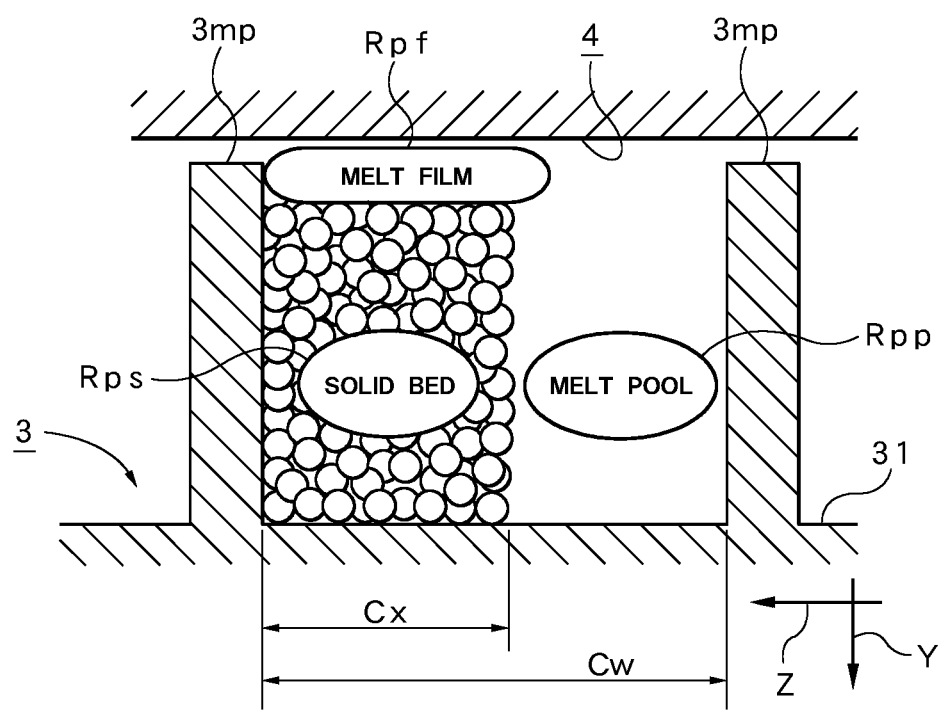
FIG. 5 is a principle diagram of a heating cylinder during the plastication process in the injection molding machine.

First, the solid-state ratio calculation formula is described with reference to the principle diagram of the heating cylinder during the plastication process shown in FIG. 5. In FIG. 5, reference numeral 3 denotes a screw, 31 represents a screw groove bottom, 3mp denotes a screw flight, and 4 denotes a heating cylinder (inner wall portion). The molten resin (pellet material Rp) transferred in the heating cylinder 4 by the screw flight 3mp generally exists in three regions: a solid bed Rps, which is a solid region in which the pellet material Rp is not dissolved; a liquid region, in which the pellet material Rp is dissolved and which has a low viscosity (i.e., a melt pool Rpp which is a molten resin); and a melt film Rpf, which is a viscous region in which the viscosity is high before reaching the molten resin. Cx represents the solid bed Rps (solid region) width at the current position, and Cw represents the length obtained by subtracting the flight width from the pitch width.

An example of the solid-state ratio calculation formula is shown in [formula 101].

$$\text{Solid-state ratio } Xc = Cx/Cw \quad [\text{formula } 101]$$
$$= (Cx'/Cw) \cdot (1 - ka \cdot \Phi i)$$
$$\text{Where } \Phi i = f(Tq, Tc) \cdot \Phi e$$

As shown in [formula 101], the solid-state ratio Xc can basically be obtained by Cx/Cw. In [formula 101], Cx' represents the width of the solid at the previous pitch, ka represents the adjustment coefficient, $\Phi i$ represents the melting rate during injection, $\Phi e$ represents the melting rate during extrusion, Tq represents the measurement time, and Tc represents the molding cycle time.

In general, in a melting mechanism including a continuously operating heating cylinder such as an extrusion molding machine, a known model formula proposed by Tadmor in 1978 is widely used as a theoretical formula for predicting a plasticized state.

On the other hand, since the injection molding machine M performs an intermittent operation (injection→measuring→standby), injection conditions such as injection positions and screw stop times different from those of the extrusion molding machine are included. Therefore, it is impossible to directly apply the known model formula to the injection molding machine M. Therefore, the solid-state ratio calculation formula used in the present embodiment is obtained by converting the model formula applicable to the extrusion molding machine into the model formula applicable to the injection molding machine M, i.e., by multiplying the function formula including the measurement time Tq and the cycle time Tc by the melting rate $\Phi e$ of the resin material (the amount indicating the melting rate and the unit is dimensionless), such as f (Tq, Tc)·$\Phi e$ shown in [formula 101], and using $\Phi i$ in the solid-state ratio calculation formula.

Thus, using the calculation formula shown in [formula 101] converts the model formula applicable to the extrusion molding machine into the model formula applicable to the injection molding machine M, thereby allowing for obtaining the solid-state ratio Xc indicating the melting ratio (melting degree) of the molten resin in the heating cylinder 4 containing the screw 3. Therefore, the solid-state ratio Xc obtained by the solid-state ratio calculation formula can be used as the estimated solid-state ratio Xc obtained based on the input basic information Do, that is, the estimated solid-state ratio Xcs.

Further, it is desirable to verify whether or not the estimated solid-state ratio Xcs matches the measured solid-state ratio of the molten resin and set a solid-state ratio calculation formula after adjustment that substantially matches the measured solid-state ratio as solid-state ratio computational data Dc in this embodiment.

The term (1−ka·$\Phi i$) in [formula 101] indicates that as the term approaches zero, that is, as the rate $\Phi i$ increases, the solid-state ratio Xc approaches zero and the molten resin in the heating cylinder 4 is completely melted. In the embodiment, the degree of unmelted solid remaining was calculated from the solid-state ratio Xc, and its correlation with the fluctuation of the resin temperature during molding was considered.

The thickness of the melt film Rpf is generally used for calculating the shear heating amount, but the measured value and the calculated value are significantly different. Therefore, the solid-state ratio (adjusted value) at the time of complete melting was specified. The calculation was performed assuming that only the liquid phase generates shear heat by separating into the solid phase and the liquid phase. As a result, it was confirmed that the calculated value almost agreed with the measured value.

Figures 6, 7:
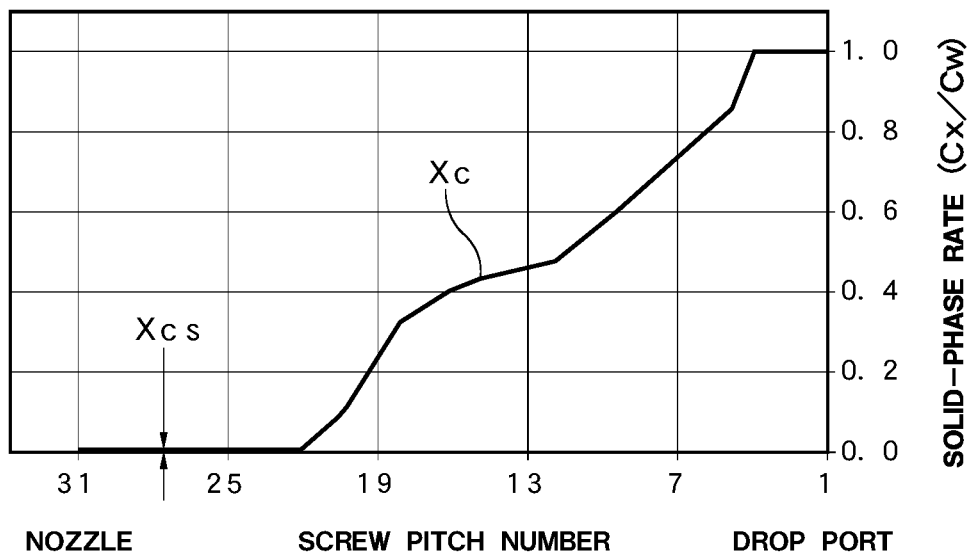
FIG. 6 is a characteristic diagram showing a change in solid-state ratio for a position of a screw for explaining a calculation function of a solid-state ratio computation processing unit provided in the molding assistance device.
FIG. 7 is a list showing, by type, the ease of adhesion of the resin to the metal serving as the basis of the resin decomposition ratio.

FIG. 6 shows the change of the solid-state ratio Xc with respect to the position of the screw 3 obtained from the solid-state ratio calculation formula. The horizontal axis indicates the screw pitch number, and the larger the number, the closer to the nozzle. The vertical axis indicates the solid-state ratio Xc. As the solid-state ratio Xc approaches zero, it approaches a completely molten state. When the solid-state ratio Xc is zero, it enters a completely molten state. In FIG. 6, the solid-state ratio Xc at the position indicated by Xcs is regarded as the estimated solid-state ratio Xcs of the molten resin at the end of the measurement.

The estimated solid-state ratio Xcs does not need to be zero in practice. It is desirable to select "0.06" as this determination criterion. It has been confirmed that this numerical value is appropriate according to the result of the experiment. As a result, when the estimated solid-state ratio Xcs satisfies "Xcs≤0.06", it can be determined that it is in a good melting state, and when "Xcs>0.06", it can be determined that the melting is insufficient (insufficient plastication). Thus, the magnitude of the estimated solid-state ratio Xcs is an index indicating a molten state such as insufficient plastication of the molten resin. Since the estimated solid-state ratio Xcs indicates the melting level of the molten resin, an unmelted polymer fraction may be used.

Therefore, if the solid-state ratio computational data Dc for calculating the solid-state ratio Xc of the molten resin in the heating cylinder 4 is set in the computational data setting unit Fs based on the basic information Do, the estimated solid-state ratio Xcs of the molten resin at the end of measurement can be obtained by the solid-state ratio computation processing unit Fcp based on the basic information Do and the solid-state ratio computational data Dc, which is described later. Thus, obtaining estimated solid phase ratio Xcs allows for accurately (quantitatively) grasping the resin's insufficient plasticization and taking appropriate measures against the insufficient plasticization. In particular, since no judgment or experience is required, even a beginner operator with little experience can improve the yield rate and molding quality of the molded product and perform more desirable molding (production). In addition, reflecting the physical properties (melting properties, etc.) of each type of the pellet material Rp in calculating the estimated solid-state ratio Xcs makes it possible to obtain the estimated solid-state ratio Xcs more accurately.

Next, a decomposition ratio computational formula is described. An example of the decomposition ratio computational formula used in the present embodiment is shown in [formula 102].

$$\text{Resin decomposition ratio } Xr = Ec \cdot Wa \cdot kb \quad \text{[formula 102]}$$

Where $Ec = f(W, L, \sigma, \gamma, \zeta)$
$Wa \propto f(\Phi m, \Phi c, Qs)$

[formula 102] is fundamentally based on the model formula of Tadmor and is the calculation formula for obtaining the resin decomposition ratio Xr in the injection molding machine M. In [formula 102], Ec is the shear heating amount [MJ] calculated from the model formula of Tadmor and is the total shear heating amount obtained by integrating the shear heating amount from the completely melted position to the tip of the screw 3. Wa is the adhesion work between molten resin and metal [MJ/m2], and kb is the adjustment factor considering the catalytic effect of the metal.

Further, in calculating the shear heating amount Ec, W represents the length obtained by subtracting the flight width from the pitch width, L represents the screw spiral length, σ represents the shear stress, γ represents the shear rate, and ζ represents the dimensionless depth. In calculating the adhesive work Wa, $\Phi m$ represents the work function of the base metal, and $\Phi c$ represents the work function of the metal coating the base metal. Finally, Qs represents the amount of oxygen adhering to the outermost surface metal. The oxygen amount Qs is measurable by an X-ray analyzer (EDX apparatus). The adhesion work Wa indicates the ease of adhesion of the molten resin to the metal, and FIG. 7 shows the ease of adhesion of the molten resin to the metal of the screw surface 3f by type. The numbers in FIG. 7 indicate that the larger the number, the easier the adhesion.

Figures 8, 9:
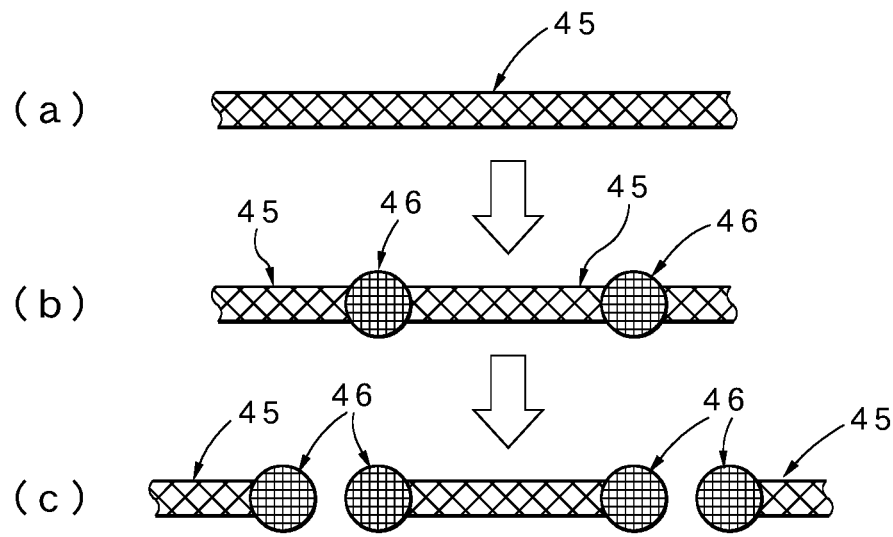
FIG. 8 is a An explanatory diagram of a deterioration principle of a resin as a basis of a resin decomposition ratio calculated by a resin decomposition ratio computation processing unit provided in the molding assistance device.
FIG. 9 is a list showing, by type, the ease with which the resin is decomposed relatively to the metal on which the resin decomposition ratio is based.

In addition, since the catalytic effect (oxidation induction time) of the metal becomes a deterioration factor for the molten resin, this catalytic effect is reflected in the coefficient kb. In general, it is known that when a polymer (resin) is heated, hydrogen is removed and thereby becomes a polymer radical active species. In the case of a polymer radical active species, in this state, the molecular weight of the polymer does not decrease, but when the polymer radical active species comes into contact with a metal, the polymer radical active species brings about a catalytic action, thereby radically linking with oxygen in the air and accelerating the decomposition of the molten resin. FIGS. 8(a) to 8(c) schematically show this phenomenon. FIG. 8(a) shows a state in which the polymer 45 is thermally activated (thermally decomposed). When the catalytic activity is performed by the metal species in this state, as shown in FIG. 8(b), an oxidation phenomenon occurs in which oxygen 46 is bonded to the activated polymer 45. If the phenomenon progresses further, as shown in FIG. 8(c), polymer 45 is reduced in molecular weight by oxidative decomposition. FIG. 9 shows the ease of decomposition of the molten resin with respect to the metal of the screw surface 3f by type. The numbers in FIG. 9 indicate that the larger the number, the easier it is to decompose.

The calculation result of the resin decomposition ratio Xr based on the decomposition ratio computational formula of [formula 102] considers the residence time, adhesive work, oxidation induction time, screw shape, etc., of the molten resin. Thus, the resin decomposition ratio Xr obtained by this decomposition ratio computational formula is useable as the resin decomposition ratio Xr estimated based on the input basic information Do, or the estimated resin decomposition ratio Xrs. By setting the decomposition ratio computational data Dr, the estimated resin decomposition ratio Xrs is easily obtainable. For example, the basic information Do used for the computation processing of the solid-state ratio computational data Dc can also be used to calculate the decomposition ratio computational data Dr.

The experiment (demonstration) confirmed that no deterioration occurs as long as the estimated resin decomposition ratio Xrs is maintained at 0.00. Therefore, a value larger than 0.00 indicates that the molten resin is in a deteriorated state (including a case where the risk of deteriorating is high). That is, the estimated resin decomposition ratio Xrs satisfying "Xrs=0.00" leads to the determination that the resin is in an excellent molten state without deterioration, and "Xrs>0.00" indicates that the resin is in a deteriorated state or has a high risk of shifting to a deteriorated state. As described above, the magnitude of the estimated resin decomposition ratio Xrs can be used as an index indicating a deteriorated state of the molten resin caused by excessive progress of plastication.

Therefore, if the decomposition ratio computational data Dr for determining the resin decomposition ratio Xr of the screw surface 3f during molding is set in the calculation formula data setting unit 9 based on the basic information Do, the estimated resin decomposition ratio Xrs can be obtained by performing the computation processing based on the basic information Do and the decomposition ratio computational data Dr by the decomposition ratio computation processing unit Fct described later. Thus, the estimated resin decomposition ratio Xrs can be easily obtained by using the basic information Do used for the computation processing of the solid-state ratio computational data Dc also for the computation processing of the decomposition ratio computational data Dr.

In addition, since the deterioration state of the molten resin can be accurately grasped by the estimated resin decomposition ratio Xrs that is easily obtained by the computation processing, an appropriate range of the molten state can be set by both the limit point on one side (insufficient plastication side) of the molten state by the estimated solid-state ratio Xcs and the limit point on the other side (excessive plastication side) of the molten state by the estimated resin decomposition ratio Xrs, thereby stabilizing and enhancing moldability and molding quality.

Next, an increasing temperature computation formula is described. An example of the increasing temperature computation formula, which is the basis of the increasing temperature computational data Dw is shown in [formula 103]. Increasing temperature $$\Delta Tu = Ec/(Qh \cdot Cm) \quad \text{[formula 103]}$$

In [formula 103], the shear heating amount Ec in [formula 102] for obtaining the resin decomposition ratio Xr described above can be used as Ec [MJ]. Qh denotes the plastication capability, and Cm represents the melting specific heat (resin specific heat).

As described above, to obtain the temperature rise $\Delta Tu$, the data relating to the above-described shear heating amount Ec can be used so that the estimated temperature rise $\Delta Tus$ can be easily obtained. To obtain the estimated temperature rise $\Delta Tus$, it is possible to obtain the shear heating amount Ec from the complete melting position to the screw tip by dividing it by the plastication capability Qh and the resin specific heat Cm. The molten resin was treated not as a Newtonian fluid such as water but as a power-law fluid such as starch syrup.

The solid-state ratio Xc and the resin decomposition ratio Xr are closely related to the temperature rise $\Delta Tu$ of the resin. Therefore, if the estimated temperature rise $\Delta Tus$ is displayed as information related to the molten state of the molten resin as information related to the estimated solid-state ratio Xcs and the estimated resin decomposition ratio Xrs in addition to information related to the estimated solid-state ratio Xcs and/or the estimated resin decomposition ratio Xrs, information related to the estimated temperature rise $\Delta Tus$ can also be checked so that the operator (user) can more accurately grasp the molten state.

Figure 10:
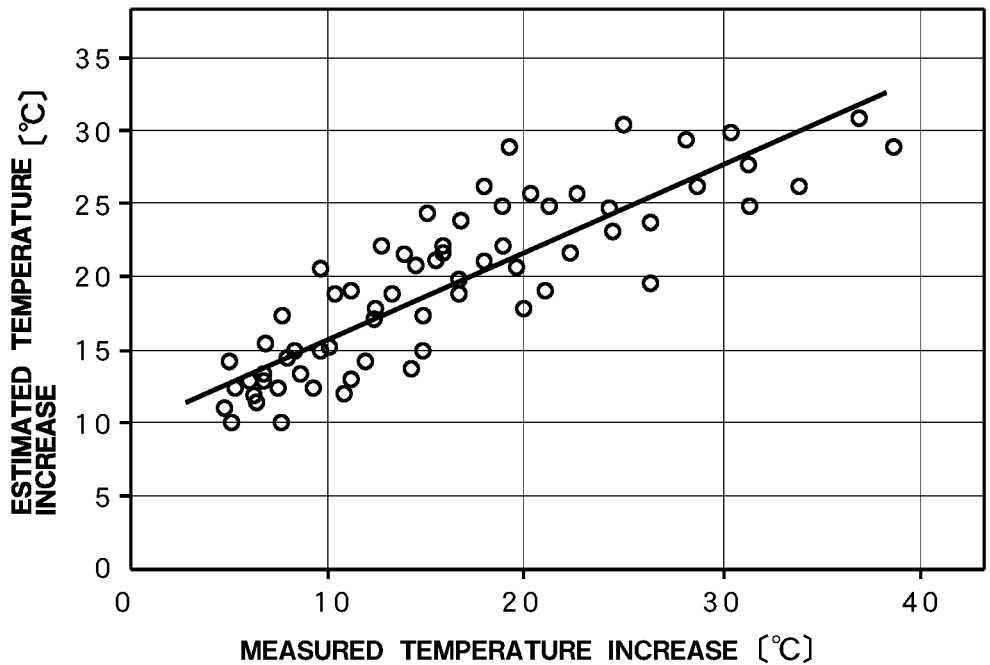
FIG. 10 is a correlation characteristic diagram showing a relationship between an estimated temperature rise and a measured temperature rise in the molding assistance device.

FIG. 10 shows a correlation characteristic between the estimated temperature increase $\Delta Tus$ and the measured temperature rise. This characteristic is obtained by using ABS resin as the resin, and the estimated temperature rise $\Delta Tus$ is lower than the critical value p=0.01 in all cases, and sufficient correlation was confirmed.

On the other hand, the data processing unit F includes a computation processing function unit 5 using the molding machine controller 7 (control body 22 and internal memory 22$m$). The computation processing function unit 5 can basically perform computation processing using the solid-state ratio computational data Dc, the decomposition ratio computational data Dr and the increasing temperature computational data Dw described above.

Therefore, the computation processing function unit 5 includes at least a solid-state ratio computation processing unit Fcp for calculating the solid-state ratio Xc of the molten resin at the end of the measurement, i.e., the estimated solid-state ratio Xcs, by the computation processing based on the basic information Do and the solid-state ratio computational data Dc, a decomposition ratio computation processing unit Fct for calculating the resin-decomposition ratio Xr of the molten resin, i.e., the estimated resin decomposition ratio Xrs, by the computation processing based on the basic information Do and the decomposition ratio computational data Dr, and an increasing temperature computation unit Fct for calculating the estimated temperature rise $\Delta Tus$ by the computation processing based on the increasing temperature computational data Dw.

Further, the computation processing function unit 5 is provided with a second determination processing unit Fcj which performs determination processing on the degree (magnitude) of the estimated solid-state ratio Xcs and/or the estimated resin decomposition ratio Xrs and outputs second assistance message data Dhs corresponding to the result of the processing.

Figure 11:
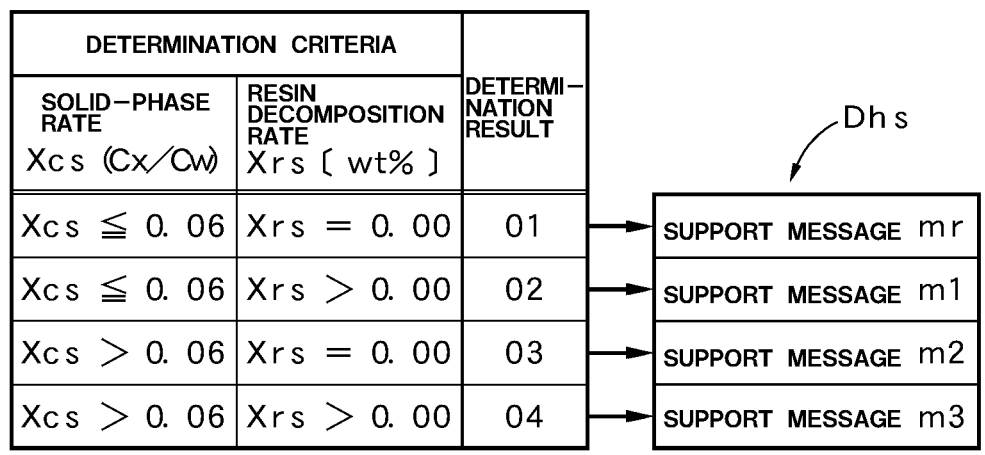
FIG. 11 is a functional description view of a second determination processing unit provided in the molding assistance device.

FIG. 11 shows the determination criterion for the determination process. In FIG. 11, the determination result "01" is a case where "Xcs≤0.06" and "Xrs=0.00". In this case, since the molten state is in a sufficient state and the molten state is not in a deteriorated state, it can be determined that the molten state is in a good molding environment. The determination result "02" is a case where "Xcs≤0.06" and "Xrs>0.00". In this case, it can be determined that the molten state is in a sufficient state, but there is a possibility that the molten state may deteriorate. The determination result "03" is a case where "Xcs>0.06" and "Xrs=0.00". In this case, it can be determined that although there is a possibility that insufficient plastication occurs, deterioration does not occur. The determination result "04" is a case where "Xcs>0.06" and "Xrs>0.00". In this case, it can be determined that there is a possibility of insufficient plastication and, at the same time, a possibility of deterioration.

In addition, the second determination processing unit Fcj has a function of outputting second assistance message data Dhs corresponding to the determination results "01" to "04". Specifically, when the determination result is "01", the assistance message mr is output. When the determination result is "02", the assistance message m1 is output. When the determination result is "03", the assistance message m2 is output. When the determination result is "04", the assistance message m3 is output.

The molding assistance device 1 includes an output processing function unit 6 shown in FIG. 1. The output processing function unit 6 is, so to speak, an embodiment of a processing function using the output of the determination result and includes a determination results display processing unit Fdi for displaying the determination result output from the second determination processing unit Fcj. Thus, the determination result is displayed on the second determination display unit 26$s$ of the data display unit 23 shown in FIG. 2. In the example, the second determination display unit 26$s$ can be displayed by switching the first determination display unit 26, which is described later. The data display unit 23 is displayed on the display 7$d$.

Thus, the assistance messages mr, m1, m2, and m3 are displayed on the second determination display unit 26$s$. In this case, each of the assistance messages mr, m2, and so forth may include a determination message indicating the result of the determination process and a countermeasure message for taking countermeasures corresponding to the determination message. Therefore, the internal memory 22$m$ stores the second assistance message data Dhs corresponding to the assistance messages mr, m1, m2, and m3. Although not shown, as an example of the assistance messages mr, m1, m2, and so forth, for example, in the assistance message mr, the words "within proper range" are displayed as the determination message. In the case of the assistance message m1, the words "the resin may be carbonized" are displayed as a determination message. In addition, the words "decrease Tm, Tr, Pr, and Rm or shorten Tc" are displayed as a countermeasure message (Tm: set temperature for heating, Tr: controlled temperature, Pr: backpressure, Rm: rotation frequency, Tc: molding cycle time) are displayed as a countermeasure message. In the case of the assistance message m2, the words "unmelted resin may be produced" are displayed as the determination message. The words "increase Tm, Tr, Pr, and Rm or increase Tc" are displayed as the countermeasure message. In the case of the assistance message m3, "please review the molding conditions" is displayed as a countermeasure message. A complete resetting of the molding conditions is prompted.

In this way, by providing the computation processing function unit 5 with the second determination processing unit Fcj for determining the magnitude of the constant solid-state ratio Xc and/or the estimated resin decomposition ratio Xr and outputting the obtained determination result, and providing the determination results display processing unit Fdi with the display function of the determination result obtained from the second determination processing unit Fcj, the operator can visually confirm the determination result and can easily come to grasp the molten state of the molten resin which is challenging to determine. Therefore, even a beginner operator can easily and reliably check whether or not the molten state of the molten resin is appropriate and quickly take necessary measures such as changing the molding conditions, thereby streamlining the molding production. In particular, combining determining the suitability of the plastication delay time Hmr and determining the estimated plastication time Hms described later can realize a high optimization level in the molding process.

Although not shown, other processing functions using the determination result may be used for automatic correction processing, which uses data relating to the estimated solid-state ratio Xcs and data relating to the estimated resin decomposition ratio Xrs as correction data corresponding to the countermeasure message and corrects corresponding molding conditions automatically.

Further, as shown in FIG. 2, the data display unit 23 shown in FIG. 19 includes, in addition to the assistance message display unit 26, a controlled temperature display unit 24, a resin state display unit 25, and a plastication time display unit 25r to be described later. In this case, the controlled temperature display unit 24 further displays the material drop port temperature, the hopper temperature, and the resin material temperature. In addition, the resin state display unit 25 is provided with an estimated resin decomposition ratio display unit 25dp, an estimated solid-state ratio display unit 25dc, and an estimated temperature rise display unit 25du. Each physical quantity is numerically displayed on each of these display units. The above is the basic function of the molding assistance device 1. This basic function maintains the resin's molten state in heating cylinder 4 in an optimal condition.

Next, with reference to FIGS. 12 to 19 and 20a to 20d, a description is given of an assistance function for reducing the plastication failure due to a lack of plastication by grasping a more accurate plastication time, which is the main part of the molding assistance device 1 according to the present embodiment.

As shown in FIG. 5, the molten resin (pellet material Rp) transferred in the heating cylinder 4 by the screw flight 3mp exists in three modes: a solid bed Rps as a solid region, a melt pool Rpp as a molten resin, and a melt film Rpf as a viscous region.

In this case, since the molten resin injected from the nozzle 4n of the heating cylinder 4 becomes the molten resin in the melt pool Rpp, the melt pool Rpp is exclusively used as a parameter, and the melt film Rpf is ignored in the calculation of the estimated temperature rise ΔTus and the estimated solid-state ratio Xcs of the molten resin.

However, since the melt film Rpf is in a state before reaching the melt pool Rpp, experiments were conducted on how the melt film Rpf affects the resin temperature and the plastication state. As a result, it has been found that the temperature factor of the molten resin injected from the nozzle 4n is mainly caused by the heating amount generated in the melt pool Rpp, and not really caused by the heating amount generated in the melt film Rpf. On the other hand, it has also been found that the heating amount generated by the melt film Rpf does not directly affect the temperature of the molten resin but significantly affects the plastication time and that the heating amount generated by the melt film Rpf is related to the delay phenomenon of the plastication time.

Figure 12:
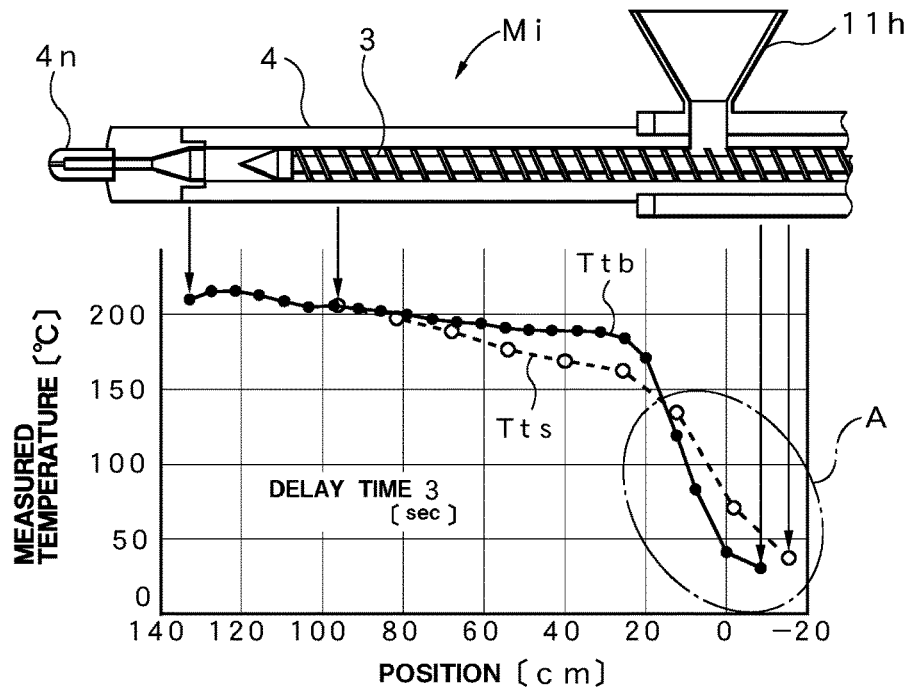
FIG. 12 is an explanatory diagram of a temperature distribution when a plastication time delay occurs in the injection molding machine.
Figure 13:
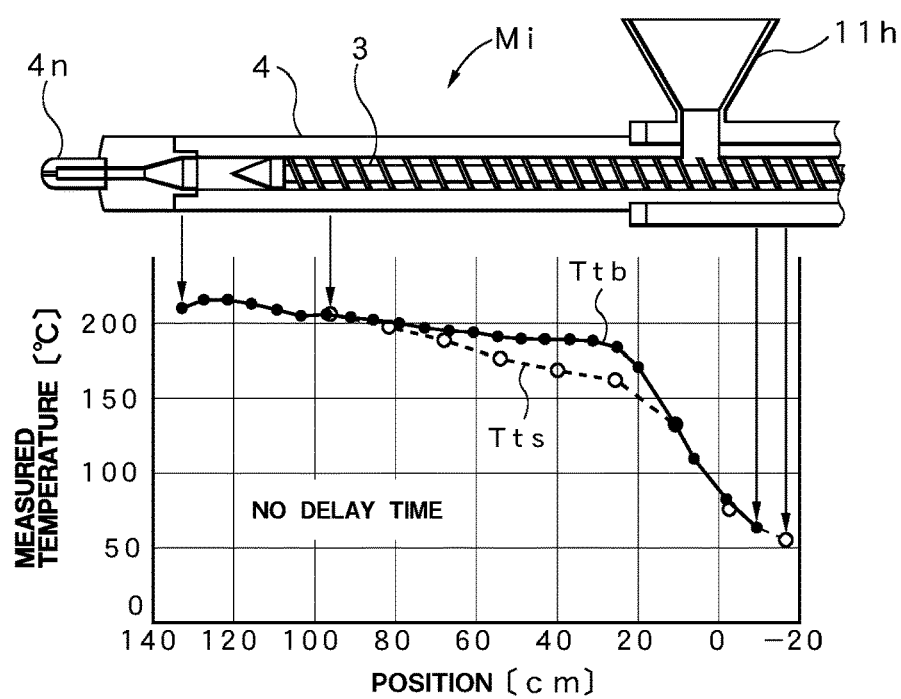
FIG. 13 is an explanatory diagram of a temperature distribution when no delay occurs in the plastication time in the injection molding machine.

With reference to FIGS. 12 and 13, these phenomena are discussed regarding the behavior of the pellet material Rp in the heating cylinder 4. FIGS. 12 and 13 clearly show the difference between the temperature of the heating cylinder and the screw surface temperature at the measurement completion position of the screw.

In general, when the dynamic friction coefficient between the heating cylinder 4 and the pellet material Rp is referred to as fb and the dynamic friction coefficient between the screw 3 and the pellet material Rp is referred to as fs, the pellet material Rp is moved forward when the relationship "fb>fs" is satisfied. Since the dynamic friction coefficient is approximately proportional to the temperature when the temperature of the heating cylinder 4 is lower than the surface temperature of screw 3, the relationship becomes "fb<fs," so to speak, a delay occurs due to the inversion of the movement phenomenon.

FIG. 12 shows a temperature distribution in which a delay time of 3 seconds occurs. In the figure, Ttb denotes the inner wall temperature of the heating cylinder 4, and Tts denotes the surface temperature of screw 3. The delay time is a value obtained by subtracting the calculated plastication time Hm from the measured plastication time Hd. As is clear from the temperature distribution in the elliptic range A shown in FIG. 12, when the delay occurs, it can be confirmed that the inner wall temperature Ttb of the heating cylinder 4 is lower than the surface temperature Tts of the screw 3. On the other hand, FIG. 13 shows a temperature distribution (delay time: −0.5 [second]) in which no delay occurs. In this case, it can be confirmed that there is almost no difference between the inner wall temperature Ttb of the heating cylinder 4 and the surface temperature Tts of the screw 3.

Considering this phenomenon, since the solid (solid bed Rps) occupies the majority in the zone of the elliptic range A mentioned above, the heating by the melt pool Rpp rarely occurs. Therefore, the heating amount of the melt film Rpf becomes relatively large. The main factor of the delay time is assumed to be the heating amount in the melt film Rpf.

As a result, the plastication time delay phenomenon is considered closely related to the heating amount Em of the melt film Rpf. Therefore, the degree of the plastication delay time Hmr, that is, the length of the plastication delay time Hmr is considered to become predictable by knowing the heating amount Em of the melt film Rpf. Therefore, this point was verified concretely.

Hereinafter, with reference to FIGS. 14 to 17, a description is given of a verification result in which the plastication delay time Hmr can be predicted based on the heating amount Em of the melt film Rpf.

As described above, in the case of an extrusion molding machine, the plastication capability in the solid transport section is calculated on the assumption that the solid plug occupies the screw. This theoretical solid transport formula is known as [formula 104], which is generalized by Tadmor. That is, the solid transport amount Gc [kg/h] is expressed by:

[Equation 1]

$$Gc = \pi \cdot N \cdot \rho s \cdot Db \frac{\tan \theta \cdot \tan \phi b}{\tan \theta + \tan \phi b} \left[ \frac{\pi}{4}(Db^2 - Ds^2) - \frac{e \cdot H}{\sin \phi a} \right] \quad \text{[formula 104]}$$

Where ρs is the solid density, H is the groove depth, Db is the inner diameter of the heating cylinder, Ds is the outer diameter of the screw, θ is the movement angle of the plug surface, φb is the spiral angle of the screw, e is the flight width, and φa is the average spiral angle.

In this case, the movement angle θ of the plug surface is derived by [formula 105].

[Equation 2]

$$\sin \theta = \frac{\sqrt{1 + K^2 - M^2} - KM}{1 + K^2} \quad \text{[formula 105]}$$

$$\text{Where } K \equiv \frac{Da}{Db} \cdot \frac{\sin \phi a + fs \cdot \cos \phi a}{\cos \phi a - fs \cdot \sin \phi a}$$

Where Da is the average diameter of the screw, the value obtained by subtracting the inner diameter of the heating cylinder and the groove depth, fs is the dynamic friction coefficient between the screw and the pellet material Rp.

This time, the plastication time was predicted with fs set as fs=fs (Δt), a dynamic friction coefficient with a temperature gradient. Suppose it is possible to know the dynamic friction coefficient fs. In that case, it would be possible to know the plastication capability considering the shape of screw 3 and the molding condition. M in [formula 105] can also be obtained by introducing fs (Δt).

Therefore, the plastication time Hm can be converted into time by obtaining the used resin capacity Vs based on the measurement and dividing the used resin capacity Vs by the solid transport amount Gc obtained from [formula 104]. That is $$Hm = f(Gc, Vs, Kb) \quad \text{[formula 106]}$$

Enables conversion.

Kb is a coefficient in consideration of the backpressure.

The plastication time Hm obtained by converting [formula 106] is defined as a provisional plastication time Hm.

Figure 14:
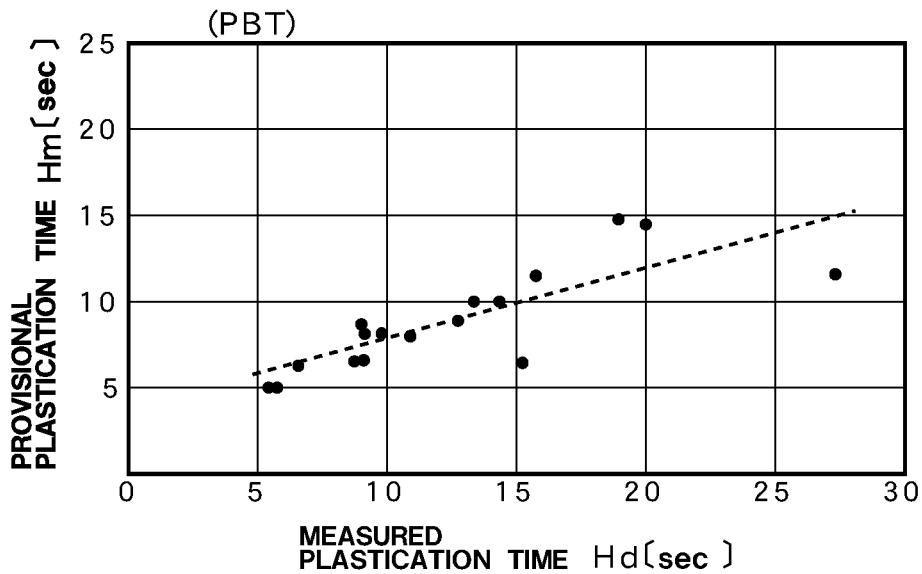
FIG. 14 is a correlation characteristic diagram showing a relationship between a measured plastication time in the injection molding machine and a provisional plastication time based on a calculation of the molding assistance device.

FIG. 14 shows an example of the provisional plastication time Hm obtained by the calculation. In this figure, PBT resin (polybutylene terephthalate) is used as the pellet material Rp. It is shown corresponding to the plastication time Hd obtained by measurement.

In this case, the correlation coefficient is r≈0.91, indicating that plastication time Hm is sufficiently predictable even with the calculated provisional plastication time Hm.

On the other hand, the Tadmor model formula, which exists as an extrusion theoretical formula, is expanded to a theoretical injection formula. The resulting formulas are shown in [formula 107] and [formula 108].

[Equation 3]

$$\delta = \left\{ \frac{[2 \cdot km(Tb - Tmo) + Va] \cdot X}{Vbx \cdot Vb \cdot \rho m \ [Cs(Tmo - Tro) + \lambda]} \right\}^{\frac{1}{2}} \quad \text{[formula 107]}$$

$$\Phi = f(Gm, Gc, Vbx, Vb, \rho m, km, Tb, Tmo, Va, Cs, Tro, \lambda) \quad \text{[formula 108]}$$

Where $Va = 2 \cdot \eta o \cdot Vj^{n+1} \cdot \delta$ $$\delta^{1-n} \frac{(e^{-b'} + b' - 1)}{(b')^2} \left( \frac{b'}{1 - e^{-b'}} \right)^{n+1}$$

Where δ is the thickness of the melt film, km is the thermal conductivity of the melt, Tb is the temperature of the heating cylinder, Tmo is the melting point, Tro is the temperature of the solid pellet, Va and Vb are the coefficients indicating the melting rate, Φ is the quantity indicating the melting rate, X is the width of the solid bed, Vbx is the peripheral velocity component of the cylinder in the screw width direction, Cs is the specific heat of the solid, ρm is the liquid density, λ is the latent heat of melting, Gm is the plastication capability considering the cycle time, ηo is the zero-shear viscosity, n is the viscosity index, and Vj is the relative velocity. Note that the molten resin depends on the power-law fluid, and b' indicates a quantity caused by the power-law fluid.

As can be seen from [Eq. 107] and [Eq. 108], the molecular term in [Eq. 107] is the sum of the heat transfer term ([2·km (Tb−Tmo)]) and the heating amount term (Va·X)). Therefore, the heating amount Em caused by the melt film Rpf can be calculated using [formula 104], [formula 107], and [formula 108]. Therefore, Gc of [formula 104] was introduced into [formula 108], and the heating amount of the temporary melt film Rpf was calculated. Gc used here is a numerical value obtained by converting the plastication time in consideration of the backpressure into Gc again in [formula 106]. A numerical value obtained by multiplying [formula 104] by Kb is used.

Figure 16:
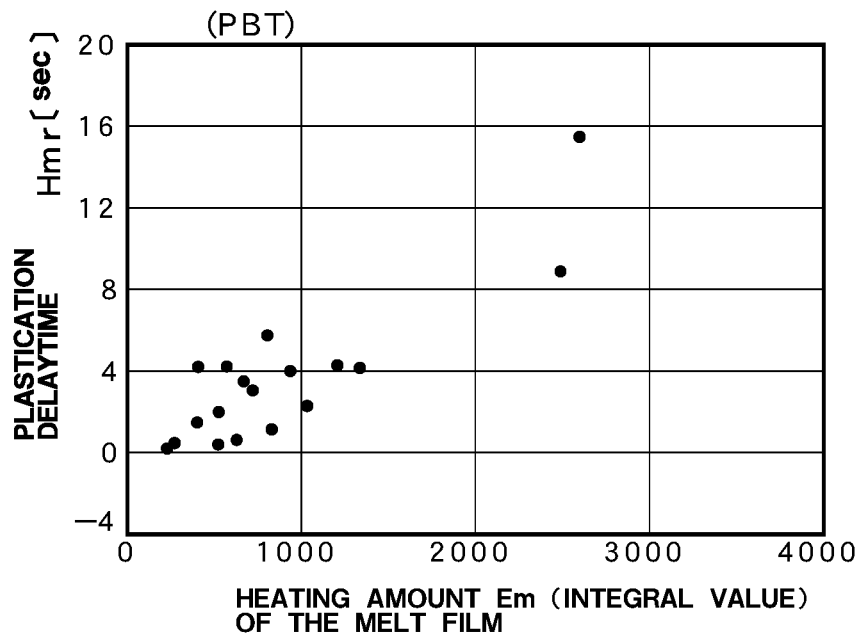
FIG. 16 is a correlation characteristic diagram showing a relationship between an integrated value of a heating amount of a melt film and a plastication delay time based on a calculation of the molding assistance device.

FIG. 16 shows the relationship between the calculated heating amount (integrated value) Em of the melt film Rpf and the plastication delay time Hmr. In this case, the plastication delay time Hmr is obtained by subtracting the provisional plastication time Hm from the measured plastication time Hd. The resin used for the verification was PBT resin.

Although not shown, the same verification was carried out for other resins (polypropylene (PP), general-purpose polystyrene (GPPS), polyacetal (POM), acrylonitrile-butadiene-styrene (ABS), impact-resistant polystyrene (HIPS), high-density polyethylene (HDPE), acrylonitrile-styrene (AS), acrylic (PMMA), PC (polycarbonate), etc.). As a result, a strong correlation was confirmed between the calculated heating amount Em of the melt film Rpf and the plastication delay time Hmr.

In this case, since the plastication delay time Hmr is an error for the proper (ideal) plastication time, the plastication delay time Hmr can be used as a correction value. That is, the plastication delay time Hmr is calculated from FIG. 16.

$$Hmr = (x \cdot Em) + y \quad \text{[formula 109]}$$

Therefore, even for an unknown resin, calculating the provisional plastication time Hm using [formula 106], introducing the result of [formula 106] into [formula 108], and performing the iterative calculation of [formulas 107] and [formula 108] can enable the calculation of the heating amount Em of the melt film Rpf. Then, if the heating amount Em is converted into the plastication delay time Hmr and the provisional plastication time Hm is corrected by the plastication delay time Hmr, the original proper plastication time (ideal value) is approached. In this embodiment, the corrected provisional plastication time Hm is defined as the estimated plastication time Hms.

Figure 15:
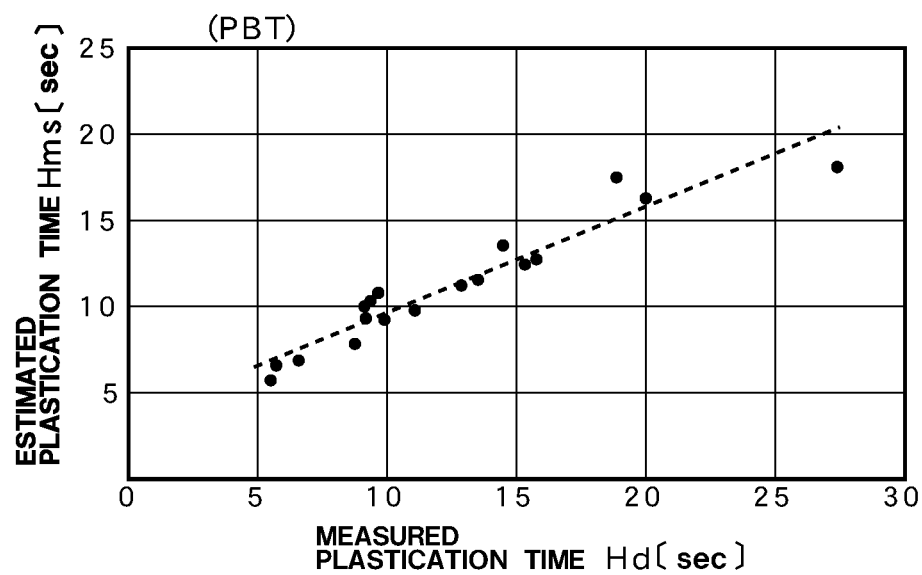
FIG. 15 is a correlation characteristic diagram showing a relationship between a measured plastication time in the injection molding machine and an estimated plastication time obtained by correcting a provisional plastication time by a plastication delay time.

FIG. 15 shows the relationship between the measured plastication time Hd and the estimated plastication time Hms. In the correlation graph shown in FIG. 14 described above, some numerical values significantly deviated from the average value. However, in the correlation graph shown in FIG. 15, these values also approach the average value. It can be confirmed that they become inconspicuous by the correction.

Figure 17:
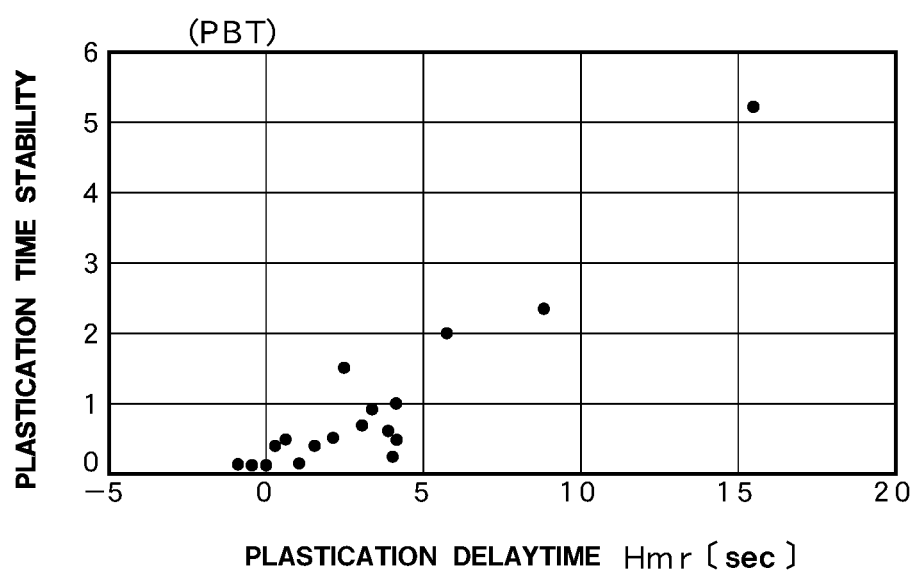
FIG. 17 is a correlation characteristic diagram showing a relationship between a plastication delay time and plastication time stability based on the calculation of the molding assistance device.

FIG. 17 shows the relationship between the variation (stability) of the measured plastication time Hd and the plastication delay time Hmr. It can be confirmed that the smaller the variation (the higher the stability), the shorter (smaller) the plastication delay time Hmr.

Therefore, summarizing these verification results, the provisional plastication time Hm can be predicted by [formula 106], including [formula 104] and [formula 105]. The heating amount Em caused by the melt film Rpf can be calculated by iterative calculation of [formula 107] and [formula 108], into which the prediction result is introduced. Further, the heating amount Em of the melt film Rpf can be converted into the plastication delay time Hmr as a correction value by [formula 109]. When the plastication delay time Hmr is considerable, there is a significant error for the appropriate (ideal) plastication time. i.e., the estimated plastication time Hms, and it is possible to determine the suitability of the stability based on the size of the plastication delay time Hmr. Further, it is possible to grasp the estimated plastication time Hms, which is a proper plastication time.

Next, referring to FIGS. 1 to 3, a description is given of a specific configuration of the molding assistance device 1 according to the present embodiment to which the principle of determining the suitability of the stability based on the plastication delay time Hmr and the principle of grasping the estimated plastication time Hms are applied based on the verification results.

First, the basic information setting function unit Fi shown in FIG. 2 is used as it is. Therefore, necessary basic information Do including at least the resin data Dr relating to the pellet material Rp, the screw data Ds relating to the screw 3, and the molding condition data Dm relating to the molding condition can be set by the basic information setting function unit Fi.

On the other hand, as shown in FIG. 1, the computation processing function unit 5 is provided with at least a provisional plastication time computation processing unit Fca to calculate the provisional plastication time Hm from the basic information Do. That is, a provisional plastication time computation processing unit Fca is provided for calculating the provisional plastication time Hm including the used resin capacity based on the measured value in the basic information Do, the moving amount per unit time of the pellet material Rp in the heating cylinder 4, and [formula 106] including the aforementioned [formula 104] and [formula 105]. Also provided is a melt film heating amount computation processing unit Fcb for calculating the heating amount Em of the melt film Rpf from the provisional plastication time Hmr obtained from the provisional plastication time computation processing unit Fca. That is, provided is a melt film heating amount computation processing unit Fcb for calculating the heating amount Em of the melt film Rpf by iterative calculation of [formula 108] and [formula 107], to which the provisional plastication time Hm obtained by the provisional plastication time computation processing unit Fca is introduced.

Further, a plastication delay time conversion processing unit Fcc is provided for converting the heating amount Em of the melt film Rpf obtained from the melt film heating amount computation processing unit Fcb into a plastication delay time Hmr by using [formula 109]. In addition, an estimated plastication time computation unit Fcs is provided for calculating the estimated plastication time Hms by correcting the provisional plastication time Hm by the plastication delay time Hmr. The estimated plastication time display processing unit Fds is provided in the output processing function unit 6 and to display on the plastication time display unit 25r in the data display unit 23 shown in FIGS. 2 and 19. As shown in FIG. 19, the plastication time display unit 25r includes an estimated plastication time display unit 25pr for displaying the estimated plastication time Hms and a plastication delay time display unit 25rr for displaying the plastication delay time Hmr.

As described above, by providing the computation processing function unit 5 with the estimated plastication time computation unit Fcs for obtaining the estimated plastication time Hms, which is derived from the provisional plastication time Hm corrected by the plastication delay time Hmr, the appropriate plastication time in consideration of the influence of the melt film Rpf can be obtained as the estimated plastication time Hms, so that it is possible to grasp the appropriateness of the plastication state by the plastication delay time Hmr and to grasp the appropriate plastication time length in plastication. Further, if the estimated plastication time display processing unit Fds for displaying the estimated plastication time Hms on the display 7d provided in the molding machine controller 7 is provided in the output processing function unit 6, the operator can quickly and easily know a proper plastication time from a visual point of view, and therefore, it is possible to easily perform fine adjustment of molding conditions based on the plastication time. Thus, it is possible to contribute to further stabilization of the molten state.

Further, the computation processing function unit 5 is provided with a first determination processing unit Fci which determines the appropriateness of the plastication delay time Hmr based on a predetermined determination criterion and outputs the obtained determination result. In the example, the first determination processing unit Fci sets the determination criterion shown in FIG. 18. Accordingly, the appropriateness of the plastication delay time Hmr is thus determined. The determination result and the assistance messages mdr, md1, md2, and md3 based on the determination result can be displayed by the determination results display processing unit Fdi provided in the output processing function unit 6 and the first determination display unit 26 shown in FIGS. 2 and 19. Therefore, the internal memory 22m stores first assistance message data Dhf corresponding to the assistance messages mdr, md1, md2, and md3.

As described above, by providing the first determination processing unit Fci in the computation processing function unit 5 for determining the plastication delay time Hmr based on a predetermined determination criterion and outputting the obtained determination result, it is possible to objectively determine whether the plastication delay time Hmr is good or bad without depending on the determination of the operator, so that even a beginner can easily and reliably check the plastication time.

Specifically, the determination criterion is such that when the plastication delay time Hmr satisfies "$-2<Hmr<2$", it is determined to be "excellent," and when the plastication delay time Hmr satisfies "2≤Hmr<5", it is determined to be "acceptable." The actual plastication delay time Hmr is calculated by subtracting the provisional plastication time Hm from the appropriate plastication time Hms. On the other hand, when the plastication delay time Hmr is in the condition of "5≤Hmr", the plastication delay time Hmr is too long and is set to "fail." On the other hand, when the plastication delay time Hmr is less than or equal to −2, or when the condition "−2≥Hmr" is satisfied, it can be confirmed from FIG. 17 that the plastication delay time Hmr is in the safety trend direction and is in the opposite direction to insufficient plastication. Therefore, it is set to "good."

Figures 18, 19:
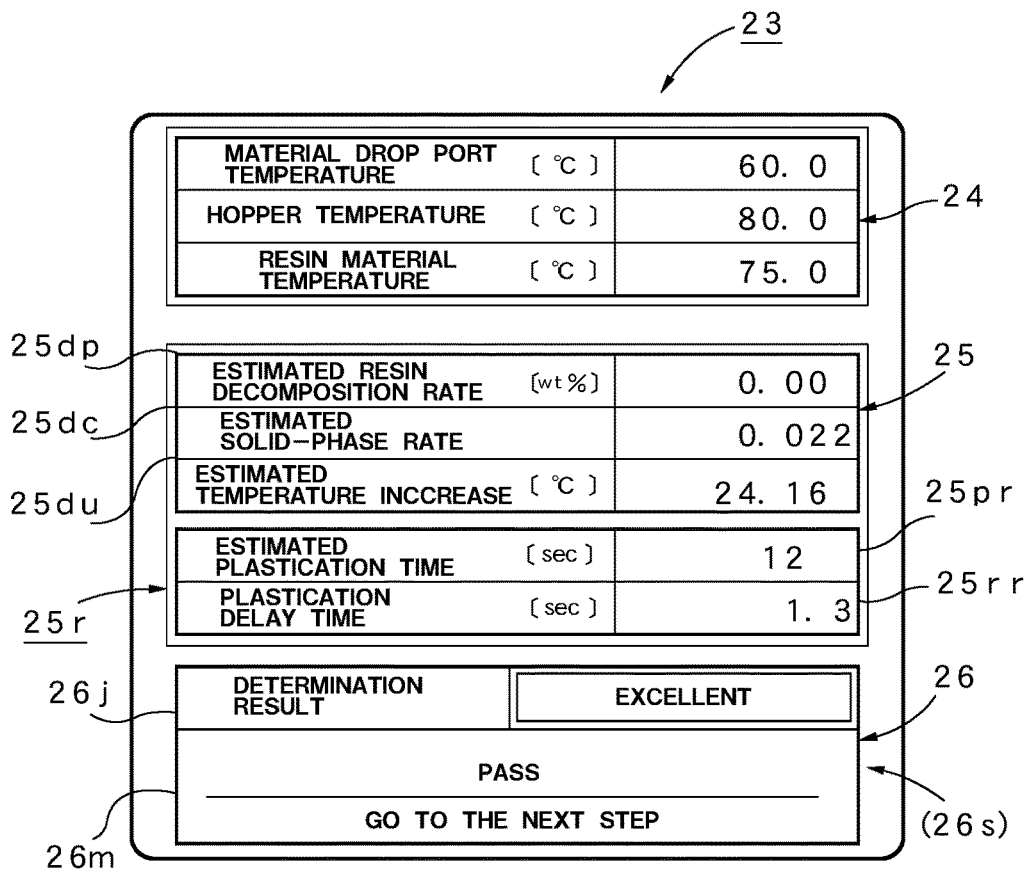
FIG. 18 is a functional description view of a first determination processing unit provided in the molding assistance device.
FIG. 19 is a screen diagram of a data display unit in the molding assistance device.

Further, the determination result is displayed on the first determination display unit 26 shown in FIG. 19 by the determination results display processing unit Fdi in the output processing function unit 6. In this case, the determination result is displayed on the determination result display unit 26j. The assistance messages mdr, md1, md2, and md3 based on the first assistance message data Dhf corresponding to the determination result are displayed on the assistance message display unit 26m.

Figure 20A:
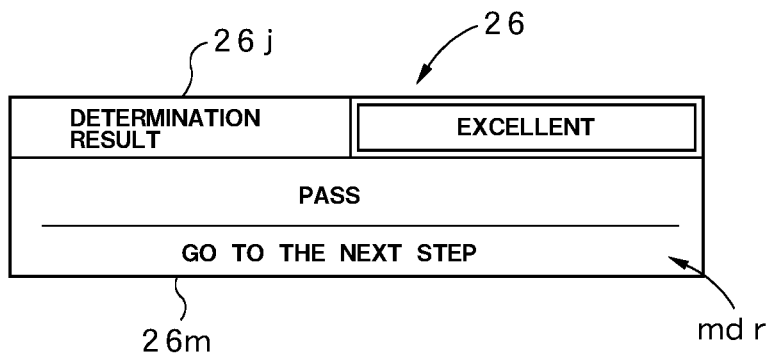
FIG. 20a is a display screen diagram showing an example of a determination message displayed by an output processing function unit provided in the molding assistance device.
Figure 20B:
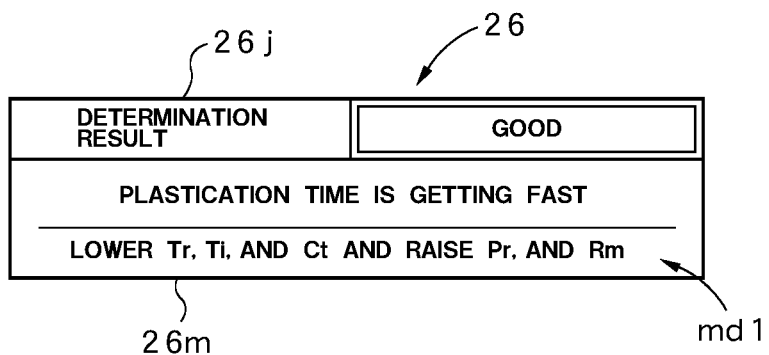
FIG. 20b is Another display screen diagram showing an example of a determination message displayed by an output processing function unit provided in the molding assistance device.
Figure 20C:
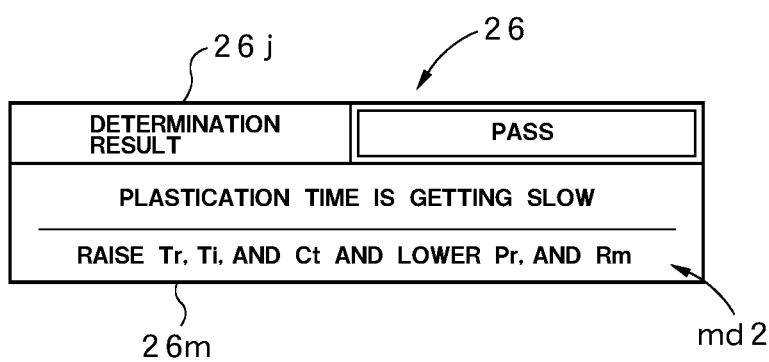
FIG. 20c is Another display screen diagram showing an example of a determination message displayed by an output processing function unit provided in the molding assistance device.
Figure 20D:
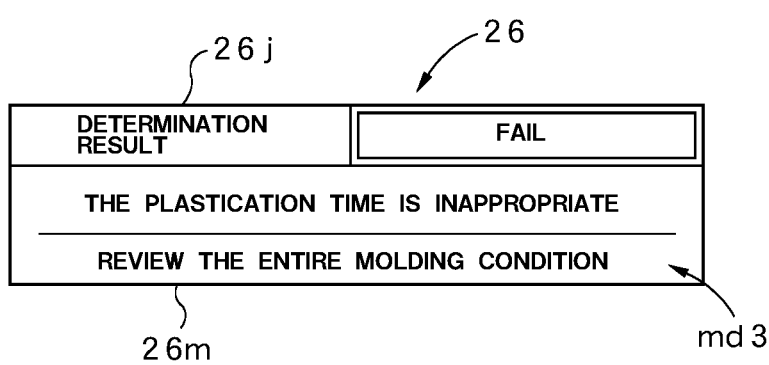
FIG. 20d is Another display screen diagram showing an example of a determination message displayed by an output processing function unit provided in the molding assistance device.

FIGS. 20a to 20d show an example of the display. FIG. 20a shows a case where the determination result is "excellent," the letters of "excellent" are displayed on the determination result display unit 26j, and an assistance message mdr of "Pass. Please proceed to the next step" is displayed on the assistance message display unit 26m as an example. FIG. 20b shows a case where the determination result is "good," the letters of "good" are displayed on the determination result display unit 26j. The assistance message md1 of "Plastication time is getting fast/Lower Tr, Ti, and Ct and increase Pr, and Rm (Tr: rear temperature, Ti: drop port temperature, Ct: cycle time, Pr: backpressure, Rm: rotation frequency)" is displayed on the assistance message display unit 26m as an example. FIG. 20c shows a case where the determination result is "Pass." The word "Pass" is displayed on the determination result display unit 26j. An assistance message md2 of "Plastication time is getting slow/Raise Tr, Ti, and Ct and lower Pr, and Rm" is displayed on the assistance message display unit 26m as an example. FIG. 20d shows a case where the determination result is "Fail," the letters "Fail" are displayed on the determination result display unit 26j. The assistance message display unit 26m displays, for example, an assistance message md3 of "Plastication time is inappropriate/Review the entire molding condition."

As described above, by providing the output processing function unit 6 with the determination results display processing unit Fdi, which displays the determination result at least on the display 7d provided in the molding machine controller 7, the operator can visually and easily check the degree (level) of "excellent, good, pass, fail" or the like as the determination result, so that an appropriate assistance message corresponding to the degree can be displayed. Thus, it is possible to quickly and accurately correct the molding conditions.

Figure 21:
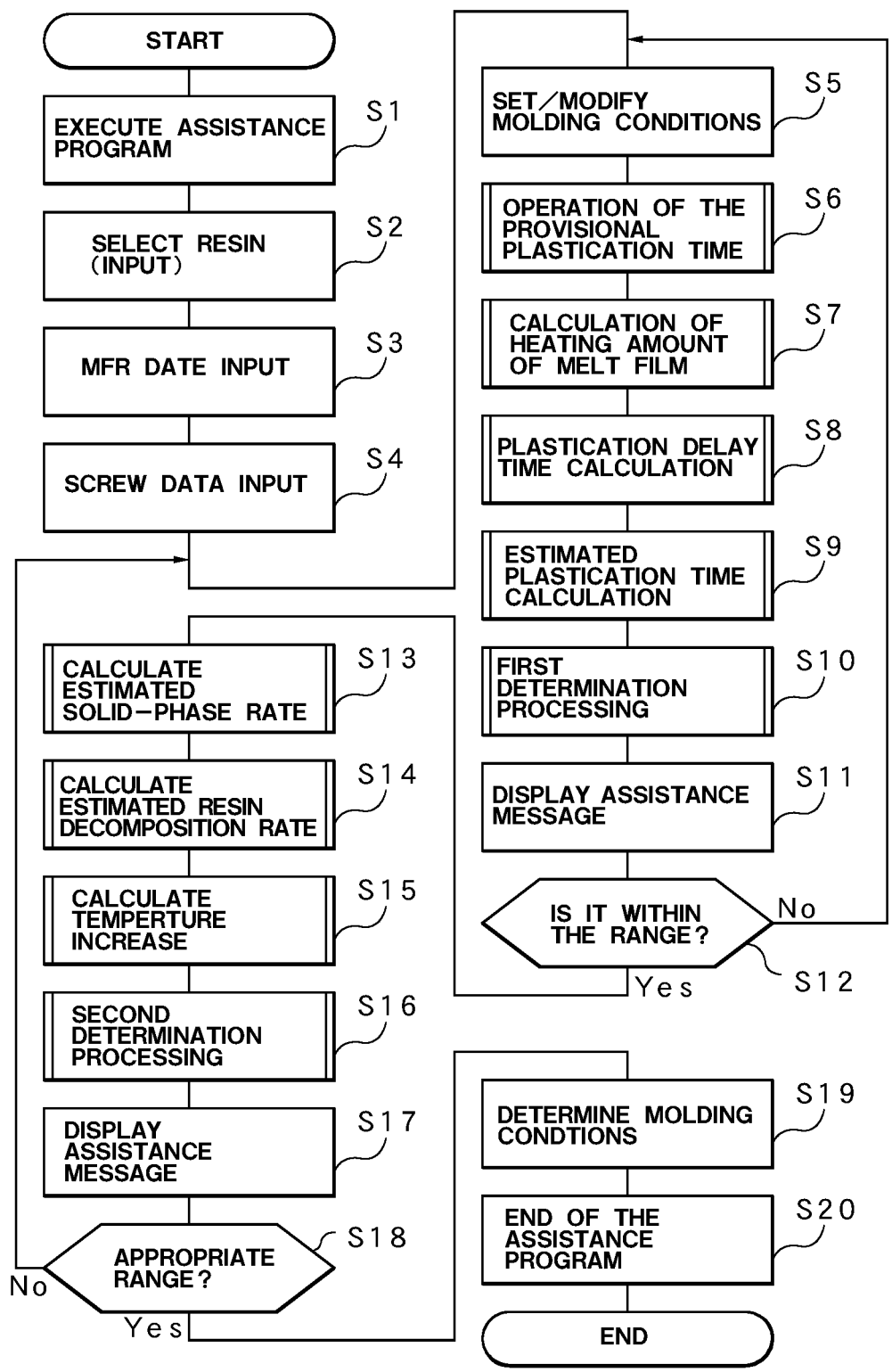
FIG. 21 is a flowchart showing a processing procedure of molding support using the molding assistance device.

Next, the method of using the molding assistance device 1 according to the present embodiment (molding assistance method) is described with reference to the flowcharts shown in FIG. 21 while referring to the drawings.

The molding assistance device 1 can basically be used when the molding conditions are set before production. The assistance program Ps stored in the internal memory 22m executes the operation related to the molding assistance process.

First, the assistance program Ps is activated to enable the molding assistance processing function (step S1). Next, the operator inputs the resin data Dr relating to the pellet material Rp from an input screen (basic information setting function unit Fi) displayed on the display 7d (step S2). In the example, when the type of resin to be used is selected from the resin selection unit Drs (FIG. 2) displayed on the input screen, data corresponding to the resin selected from data relating to various resins relating to various pellet materials Rp registered in the internal memory 22m in advance is set as input data. Further, the MFR data Drf (FIG. 2) is input by a numerical value (step S3). In this case, the MFR data Drf may be selected and input in the same manner as the resin type. Next, the screw data Ds is input (step S4). In this case, individual dimensions, materials, and the like may be input numerically or selected from the screw data input screen. The model number attached to the screw may be automatically set from previously registered data by selecting from the input screen display.

On the other hand, when the setting (input) of the basic information Do is complete, the operator sets the molding conditions in the injection molding machine M according to a standard-setting procedure (step S5). The molding conditions can be set on the molding conditions setting screen. The set molding conditions are set as the molding condition data Dm. In addition, when the input processing necessary for the molding preparation is performed, the setting (input) relating to the required basic information Do is completed.

When the processing for setting the molding conditions is complete, a predetermined assistance start key (not shown) is turned ON. Thus, first, the provisional plastication time computation processing unit Fca executes the computation processing. The provisional plastication time Hm is obtained from the set basic information Do (step S6). Further, the melt film heating amount computation processing unit Fcb executes the computation processing to obtain the heating amount Em of the melt film Rpf (step S7). Further, the data relating to the heating amount Em of the melt film Rpf obtained by the melt film heating amount computation processing unit Fcb is given to the plastication delay time conversion processing unit Fcc and is converted into the plastication delay time Hmr by executing the computation processing by the plastication delay time conversion processing unit Fcc (step S8).

Next, data relating to the provisional plastication time Hm obtained by the provisional plastication time computation processing unit Fca and data relating to the plastication delay time Hmr obtained by the melt film heating amount computation processing unit Fcb are given to the estimated plastication time computation unit Fcs, and the computation processing by the estimated plastication time computation unit Fcs corrects the provisional plastication time Hm by the plastication delay time Hmr. Thus, the estimated plastication time Hms is obtained (step S9).

Further, data relating to the plastication delay time Hmr is given to the first determination processing unit Fci. A determination process for the length (size) of the plastication delay time Hmr is executed (step S10). The determination results of the first determination processing unit Fci are given to the determination results display processing unit Fdi. The determination results display processing unit Fdi performs the display processing. Thus, the determination results are displayed by the first determination display unit 26 in the data display unit 23. That is, in the determination result display unit 26j shown in FIG. 19, one of "excellent," "good," "pass," or "fail" is displayed as the determination result. In addition, the assistance message display unit 26m displays the assistance message (FIGS. 20a to 20d) corresponding to the determination result.

Further, the estimated plastication time display unit 25*pr* in the plastication time display unit 25*r* numerically displays the estimated plastication time Hms. The plastication delay time display unit 25*rr* numerically displays the plastication delay time Hmr (step S11).

At this time, when the determination result is "excellent," it is possible to advance to the next step. On the other hand, when any of "good," "pass," and "fail" is displayed, the molding conditions are corrected or reset according to the assistance message md1, md2, or md3 displayed corresponding to the determination result (steps S12, S5, or others). Then, the processing related to the modification or resetting of the molding conditions may be repeated until the final result becomes "excellent." Thus, the setting of the appropriate (ideal) plastication time, that is, the estimated plastication time Hms, by the molding assistance device 1 according to the present embodiment is complete (step S12).

On the other hand, the molding assistance device 1 according to the present embodiment has the basic function of estimating the estimated solid-state ratio Xcs, the estimated resin decomposition ratio Xrs, and the estimated temperature rise ΔTus. Therefore, even in these estimation processes, it is possible to perform estimation processes using the corrected proper estimated plastication time Hms.

Therefore, when utilizing the basic function, the molding assistance processing can be continued. In this case, first, the estimated solid-state ratio Xcs is obtained from the basic information Do and the solid-state ratio computational data Dc by the computation processing of the solid-state ratio computation processing unit Fcp (step S13). Next, an estimated resin decomposition ratio Xrs is obtained from the basic information Do and the decomposition ratio computational data Dr by the decomposition ratio computation processing unit Fcr (step S14). Next, the increasing temperature computation unit Fct calculates the estimated temperature rise ΔTus from the increasing temperature computational data Dw (step S15). The obtained estimated solid-state ratio Xcs, estimated resin decomposition ratio Xrs, and estimated temperature rise ΔTus are displayed on the resin state display unit 25 shown in FIG. 2, that is, on the estimated resin decomposition ratio display unit 25*dp*, the estimated solid-state ratio display unit 25*dc*, and the estimated temperature rise display unit 25*du* in FIG. 19, respectively.

On the other hand, if the estimated solid-state ratio Xcs and the estimated resin decomposition ratio Xrs are obtained, the second determination processing unit Fcj performs the determination processing. That is, the magnitudes (degrees) of the estimated solid-state ratio Xcs and the estimated resin decomposition ratio Xrs are determined according to the determination criteria shown in FIG. 11 (step S16). Based on the result of the determination process, the assistance message mr, m1, m2, or m3 shown in FIG. 11 corresponding to the result is displayed (step S17). As described above, this display can be performed by switching the display by the first determination display unit 26 shown in FIG. 2 to the display by the second determination display unit 26*s*.

The display by the second determination display unit 26*s* is performed as follows as an example. First, in the case of the determination result "01" shown in FIG. 11, an assistance message mr indicating "within a proper range" is displayed, and the process proceeds to the next step. On the other hand, in the case where the determination result is "02", since the estimated resin decomposition ratio Xrs is in a high state, for example, a determination message "The resin may be carbonized" is displayed in the assistance message m1, and a countermeasure message "Decrease Tm, Tr, Pr, and Rm or shorten Tc" (Tm: set temperature for heating, Tr: controlled temperature, Pr: backpressure, Rm: rotation frequency, Tc: molding cycle time) is displayed. In the case of the determination result "03", since the estimated solid-state ratio Xcs is in a high state, for example, a determination message "Unmelted resin may be produced" is displayed and a countermeasure message "Increase Tm, Tr, Pr, and Rm or increase Tc" is displayed in the assistance message m2. In the case of the determination result "04", since it is in an inappropriate state, for example, "Review molding conditions" is displayed in the assistance message m3. A complete resetting of the molding conditions is prompted.

When any of the determination results "02", "03" and "04" is displayed, the molding condition is corrected or reset according to the assistance message m1, m2 or m3 displayed corresponding to the determination result (steps S18, S5, or others). In this case, the processing related to the modification or resetting of the molding conditions may be repeated until the final determination result becomes "01".

As a result, it is possible to optimize the molding conditions based on the assistance by the molding assistance device 1 according to the present embodiment so that the setting of the molding conditions is confirmed (S19). Further, an end key (not shown) is turned on to end the execution of the assistance program Ps (step S20).

Therefore, the molding assistance device 1 according to the present embodiment is provided with, as a basic configuration, a computation processing function unit 5 comprising a basic information setting function unit Fi for setting basic information Do including at least the resin data Dr relating to the pellet material Rp, the screw data Ds relating to the screw 3, the molding condition data Dm relating to the molding condition, a provisional plastication time computation processing unit Fca for calculating a provisional plastication time Hm at least from the basic information Do, a melt film heating amount computation processing unit Fcb for calculating a heating amount Em of a melt film Rpf from the provisional plastication time Hm obtained from the provisional plastication time computation processing unit Fca, a plastication delay time conversion processing unit Fcc for converting the heating amount Em of the melt film Rpf obtained from the melt film heating amount computation processing unit Fcb into a plastication delay time Hmr, and an output processing function unit 6 for outputting a plastication delay time Hmr or plastication information Dt obtained based on the plastication delay time Hmr, so that a plastication time can be obtained in consideration of the heating amount Em of the melt film Rpf. As a result, it is possible to stably produce a molten state in which the molten resin's unmelted fraction (solid-state ratio) is maintained at a predetermined level or less. In particular, it is possible to improve the yield of good products and improve molding quality by eliminating plastication failure. Further, molding assistance device 1 can acquire data related to the plastication time before production, eliminating a step of operating an actual injection molding machine. Therefore, it is possible to reduce the number of steps for determining the plastication time and effectively avoid wasting resin material. Furthermore, the plastication time can be easily and accurately determined based on data such as the resin data Dr, the screw data Ds and the molding condition data Dm. Thus, the molding assistance device can be broadly utilized in various injection molding machines and is excellent in versatility and expandability.

So far, a detailed explanation is made regarding the best embodiment. However, the present invention is not limited to such an embodiment, and can be arbitrarily changed, added to, or deleted from the detailed configuration, shape, material, quantity, numerical value, technique, and so forth without departing from the gist of the present invention.

For example, the types of the resin data Dr, the screw data Ds, and the molding condition data Dm described in the embodiment are examples and may include various other related data and may be added as necessary. Further, the determination criteria listed in the first determination processing unit Fci and the second determination processing unit Fcj are also examples. Any determination criteria that set any level and range can be set. On the other hand, the calculation formulas used in the provisional plastication time computation processing unit Fca, the melt film heating amount computation processing unit Fcb, and the plastication delay time conversion processing unit Fcc are not limited to the examples. Various other calculation means can be used as long as a target calculation result can be obtained. Although it is desirable to provide the estimated plastication time display processing unit Fds, it is optional to provide it. Further, although it is desirable to utilize the estimated solid-state ratio Xc and the estimated resin decomposition ratio Xr in combination with the process relating to the estimated plastication time Hms, they are not essential elements in the present invention. On the other hand, although an example in which the pellet material Rp is applied has been described, the present invention is not necessarily limited to the pellet material Rp, such as a resin material similar to the pellet material Rp. In addition, although an example is described where the basic information setting function unit Fi is input from the touch panel 7*dt* of the display 7*d*, various input means can be applied as the basic information setting function unit Fi in the case data in an external memory storing the basic information Do is transferred or transmitted by communication means.

INDUSTRIAL APPLICABILITY

The molding assistance device according to the present invention can be utilized in various injection molding machines for injecting and filling a mold with a plasticized molten resin by a screw and molding the resin.

The invention claimed is:

1. A molding assistance device is provided for an injection molding machine which performs molding support for an injection molding machine that injects and fills a mold with a plasticized molten resin by means of a screw and molds the resin, the molding assistance device comprising:
a driver group configured to drive the molding machine;
a controller including a CPU and an memory, connected to the driver group, and configured to control the driver group to drive the molding machine;
a display connected to the controller,
wherein the controller is programmed to function as:
a basic information setting function unit which sets basic information including at least resin data relating to a pellet material, screw data relating to a screw, and molding condition data relating to molding conditions;
a computation processing function unit which has at least a provisional plastication time computation processing unit for calculating a provisional plastication time from the basic information,
a melt film heating amount computation processing unit for calculating a heating amount of a melt film from the provisional plastication time obtained from the provisional plastication time computation processing unit, and
a plastication delay time conversion processing unit for converting the heating amount of the melt film obtained from the melt film heating amount computation processing unit into a plastication delay time; and
an output processing function unit which outputs the plastication delay time or plastication information obtained based on the plastication delay time to the display,
wherein the screw data includes data relating to a type of material of the screw surface,
wherein said computation processing function unit includes a decomposition ratio computation processing unit for calculating an estimated resin decomposition ratio by using decomposition ratio computational data for calculating the resin decomposition ratio of the screw surface during molding based on said basic information, and
wherein the controller is further programmed to control the display to switch between a first determination results display and a second determination results display, the first determination results display including a determination of appropriateness of the plastication delay time based on a first predetermined determination criterion along with first assistance messages, the second determination results display including a determination of appropriateness of the estimated resin decomposition ratio of the screw surface during molding based on a second predetermined determination criterion along with second assistance messages, and
wherein the controller is further programmed to optimize the molding conditions based on the first and second determination results displays, and control the driver group to drive the molding machine based on the optimized molding conditions.

2. The molding assistance device for an injection molding machine according to claim 1, wherein the resin data includes at least data relating to a type of resin and a melt flow rate.

3. The molding assistance device for an injection molding machine described in claim 1, wherein the computation processing function unit includes a first determination processing unit that determines the plastication delay time based on a predetermined determination criterion and outputs the result of the determination.

4. The molding assistance device for an injection molding machine according to claim 3, wherein the output processing function unit includes a determination results display processing unit for displaying the determination results at least on the display connected to the controller.

5. The molding assistance device for an injection molding machine described in claim 1, wherein the computation processing function unit includes an estimated plastication time computation unit for obtaining an estimated plastication time which is a plastication time obtained by correcting the provisional plastication time by the plastication delay time.

6. The molding assistance device for an injection molding machine described in claim 5, wherein the output processing function unit includes an estimated plastication time display processing unit for displaying the estimated plastication time on the display connected to the controller.

7. The molding assistance device for an injection molding machine described in claim 1, wherein the computation processing function unit includes a solid-state ratio computation processing unit for calculating an estimated solid-state ratio of the molten resin at the end of measurement by calculation using solid-state ratio computational data for calculating the solid-state ratio of the molten resin in the heating cylinder based on the basic information.

8. The molding assistance device for an injection molding machine described in claim 4, wherein the computation processing function unit comprises a second determination processing unit that determines a magnitude of an estimated solid-state ratio and outputs the obtained determination result, and the determination results display processing unit includes a display function of the determination results obtained from the second determination processing unit.

9. The molding assistance device for an injection molding machine described in claim 4, wherein the computation processing function unit comprises a second determination processing unit that determines a magnitude of the estimated resin decomposition ratio and outputs the obtained determination result, and the determination results display processing unit includes a display function of the determination results obtained from the second determination processing unit.

10. The molding assistance device for an injection molding machine described in claim 4, wherein the computation processing function unit comprises a second determination processing unit which determines a magnitude of an estimated solid-state ratio and the estimated resin decomposition ratio and outputs the obtained determination results, and the determination results display processing unit includes a display function of the determination results obtained from the second determination processing unit.

11. The molding assistance device for an injection molding machine described in claim 2, wherein the computation processing function unit includes a first determination processing unit that determines the plastication delay time based on a predetermined determination criterion and outputs the result of the determination.

12. The molding assistance device for an injection molding machine described in claim 7, wherein the computation processing function unit comprises a second determination processing unit that determines a magnitude of the estimated solid-state ratio and outputs the obtained determination result, and a determination results display processing unit includes a display function of the determination results obtained from the second determination processing unit.

13. The molding assistance device for an injection molding machine described in claim 1, wherein the computation processing function unit comprises a second determination processing unit that determines a magnitude of the estimated resin decomposition ratio and outputs the obtained determination result, and a determination results display processing unit includes a display function of the determination results obtained from the second determination processing unit.

14. The molding assistance device for an injection molding machine described in claim 7, wherein the computation processing function unit comprises a second determination processing unit which determines a magnitude of the estimated solid-state ratio and the estimated resin decomposition ratio and outputs the obtained determination results, and a the determination results display processing unit includes a display function of the determination results obtained from the second determination processing unit.

15. The molding assistance device for an injection molding machine described in claim 1, wherein the computation processing function unit comprises a second determination processing unit which determines a magnitude of an estimated solid-state ratio and the estimated resin decomposition ratio and outputs the obtained determination results, and a the determination results display processing unit includes a display function of the determination results obtained from the second determination processing unit.

* * * * *